United States Patent
Tsubota et al.

(10) Patent No.: US 8,022,946 B2
(45) Date of Patent: Sep. 20, 2011

(54) WIPE PATTERN GENERATION APPARATUS

(75) Inventors: Kazuhiro Tsubota, Kanagawa (JP); Hiroyuki Izumi, Kanagawa (JP)

(73) Assignee: Panasonic Corporation, Osaka (JP)

( * ) Notice: Subject to any disclaimer, the term of this patent is extended or adjusted under 35 U.S.C. 154(b) by 683 days.

(21) Appl. No.: 12/090,543

(22) PCT Filed: Nov. 2, 2006

(86) PCT No.: PCT/JP2006/322027
§ 371 (c)(1),
(2), (4) Date: Apr. 17, 2008

(87) PCT Pub. No.: WO2007/052771
PCT Pub. Date: May 10, 2007

(65) Prior Publication Data
US 2009/0135186 A1     May 28, 2009

(30) Foreign Application Priority Data

Nov. 7, 2005  (JP) ................. 2005-322280
Nov. 7, 2005  (JP) ................. 2005-322281

(51) Int. Cl.
G06F 17/00 (2006.01)
G06F 12/06 (2006.01)
G09G 5/00 (2006.01)

(52) U.S. Cl. ........ 345/418; 345/442; 345/619; 345/573; 348/594

(58) Field of Classification Search ................. 345/442, 345/619, 573, 418; 348/594
See application file for complete search history.

(56) References Cited

U.S. PATENT DOCUMENTS

| | | | | |
|---|---|---|---|---|
| 4,954,898 A | * | 9/1990 | Nakata | 348/594 |
| 5,051,734 A | * | 9/1991 | Lake, Jr. | 345/573 |
| 6,043,852 A | * | 3/2000 | Nakata | 348/594 |

FOREIGN PATENT DOCUMENTS

| | | |
|---|---|---|
| JP | 01-251185 | 10/1989 |
| JP | 01280971 A * | 11/1989 |

(Continued)

OTHER PUBLICATIONS

International Search Report Dated Feb. 6, 2007.

*Primary Examiner* — Chante Harrison
(74) *Attorney, Agent, or Firm* — Pearne & Gordon LLP

(57) ABSTRACT

A wipe pattern generation apparatus that can generate wipe patterns of various shapes at high speed and moreover can be miniaturized. is provided.

A wipe pattern generation apparatus 100 includes a sin θ generation section 101 for calculating sin θ from input angle information θ; a multiplier 103 for multiplying the calculation result of sin θ by a first coefficient; a cos θ generation section 102 for calculating cos θ from the angle information θ; a multiplier 104 for multiplying the calculation result of cos θ by a second coefficient; a multiplier 106 for multiplying the result of adding output of the multiplier 103 and output of the multiplier 104 by a third coefficient and outputting as the reciprocal of the distance from the polar coordinate center to an arbitrary line on a display screen; a multiplier 107 for multiplying output of the multiplier 106 by distance information r; and a comparator 108 for making a comparison between output of the multiplier 107 and a fourth coefficient, and generates wipe pattern output data 110 from the angle information θ and the distance information r.

3 Claims, 27 Drawing Sheets

FOREIGN PATENT DOCUMENTS

| | | |
|---|---|---|
| JP | 04-130872 | 5/1992 |
| JP | 06-303515 | 10/1994 |
| JP | 08-336072 | 12/1996 |
| JP | 10-065966 | 3/1998 |
| JP | 3018450 | 1/2000 |
| JP | 2000-324393 | 11/2000 |
| JP | 3289850 | 3/2002 |
| JP | 3480583 | 10/2003 |

* cited by examiner

FIG. 31

PATTERN MEMORY 806 ADDRESS MAP

| Address Range | Data |
|---|---|
| 0x_0000_0000 – 0x_0fff_ffff | TRIANGLE DATA |
| 0x_1000_0000 – 0x_1fff_ffff | PENTAGON DATA |
| 0x_2000_0000 – 0x_2fff_ffff | HEXAGON DATA |
| 0x_3000_0000 – 0x_2fff_ffff | HEXAGON DATA |
| 0x_3000_0000 – 0x_3fff_ffff | OCTAGON DATA |
| 0x_4000_0000 | ... |

WIPE PATTERN GENERATION APPARATUS

TECHNICAL FIELD

This invention relates to a wipe pattern generation apparatus used for video production, etc., and in particular to a wipe pattern generation apparatus that can generate a large number of types of wipe patterns.

BACKGROUND ART

For example, in video produced as a moving image like TV broadcasting, usually a large number of frame images consecutive in time series are switched in sequence at given time intervals (for example, 1/60-second frame period) for output. However, to switch a scene in the same program or to switch the program, the continuity of the frame images output in sequence is interrupted suddenly and thus there is a possibility that an unnatural sense may be given to the viewer. In such a case, gradual switching is performed from a frame image of the preceding scene to a frame image of the following scene, whereby the viewer can be reliably informed of scene transition.

At the switching time, two areas are formed in the same screen and the frame image of the scene before the switching is displayed in one area and the frame image of the scene after the switching is displayed in the other area, whereby it is made possible to inform the viewer of scene switching more clearly. As the boundary of more than one area on such a screen, it is possible to use a straight line as a simplest example, but effective scene switching can be accomplished by selectively using patterns of various shapes. To generate such a boundary pattern, a wipe pattern generation apparatus is used.

For example, an art disclosed in patent document 1 is known as an art concerning a wipe pattern generation apparatus in a related art. This kind of wipe pattern generation apparatus switches two video inputs for display in response to the value of the comparison result between the distance of each position from the center coordinates on the screen and a threshold value using coordinate information representing each position on the display screen as polar coordinates.

The wipe pattern generation apparatus in the related art includes a polar coordinate conversion section 803, pattern memory 806, a multiplier 808, and a comparator 809, for example, as shown in FIG. 26. Coordinates representing a scan position on a display screen as shown in FIG. 27 are input to the polar coordinate conversion section 803 as a combination of an x coordinate 801 and a y coordinate 802. The x coordinate 801 represents a pixel position in a horizontal direction on the screen and the y coordinate 802 represents a pixel position in a vertical direction on the screen.

In fact, scanning is executed in the order of (1), (2), (3), and (4) about each scan line shown in FIG. 27 and the current scan position is input to the polar coordinate conversion section 803 as a combination of the x coordinate 801 and the y coordinate 802. The polar coordinate conversion section 803 converts the input combination of the x coordinate 801 and the y coordinate 802 into position information of polar coordinate representation.

In the wipe pattern generation apparatus, in the polar coordinate representation, the coordinates of each position are represented by angle θ and distance r. That is, with a predetermined polar coordinate origin 811 as the center, the coordinates are represented by a combination of a θ coordinate 804 of the angle θ representing an inclination relative to the reference axis and an r coordinate 805 representing the distance r from the polar coordinate origin 811 to each position, as shown in FIG. 28.

The pattern memory 806 retains information of the r coordinate 805 representing the distance r from the polar coordinate origin 811 in each address associated with the θ coordinate 804. That is, the pattern memory 806 retains as pattern data corresponding to a predetermined pattern the value corresponding to the distance r from the polar coordinate origin 811 to each point on the contour of a wipe pattern to generate the pattern for each angle θ. Therefore, if the θ coordinate 804 is input to the pattern memory 806 as a read address, the pattern data representing the distance in the corresponding direction is read from the pattern memory 806.

The multiplier 808 multiplies the pattern data representing the distance read from the pattern memory 806 by an externally input coefficient 807 to scale up/down a generated wipe pattern and outputs the result. The comparator 809 makes a comparison between the value output by the multiplier 808 and the value of the r coordinate 805 output from the polar coordinate conversion section 803 and outputs the comparison result as wipe pattern output 810. The wipe pattern output 810 output from the comparator 809 is binary data and represents which of the outside and the inside of the wipe pattern contour the position of each point exists in.

For example, if data representing a pattern of a triangle is stored in the pattern memory 806, the pattern data representing the distance from the polar coordinate origin 811 to each point on the contour of the triangle pattern is read from the pattern memory 806 in response to the input value of the θ coordinate 804, as shown in FIG. 29. Since the pattern data read from the pattern memory 806 is multiplied by the coefficient 807 by the multiplier 808, pattern scaling up or down processing can be performed by the multiplication.

In fact, a display screen is scanned in sequence and position information of each scan position is input to the polar coordinate conversion section 803 as a combination of the x coordinate 801 and the y coordinate 802 and therefore the wipe pattern output 810 output from the comparator 809 becomes as shown in FIG. 30. That is, whether the position of each point is in the inside or the outside of the contour with the contour of the triangle pattern as the boundary is determined and the display screen is partitioned into two regions as indicated by hatch lines and a white background in the figure.

Patent document 1: JP-A-10-65966

DISCLOSURE OF THE INVENTION

Problems to be Solved by the Invention

To generate a wipe pattern, in fact, a further complicated pattern is required and various types of patterns are required in the actual circumstances. However, if an attempt is made to realize various wipe patterns in the wipe pattern generation apparatus in the related art as described above, large-capacity pattern memory is indispensable. For example, to generate various patterns like a triangle, a pentagon, a hexagon, . . . , a storage area to store data needs to be reserved in pattern memory for each pattern type, as shown in FIG. 31.

In recent years, the display screen has been put into a higher resolution and therefore it is also necessary to execute wipe pattern generation processing at high speed. However, if large-capacity ROM (read-only memory) is used as large-capacity pattern memory, it becomes difficult to generate a wipe pattern on a high-resolution display screen because the access speed to the memory is low.

On the other hand, in recent years, a semiconductor device wherein a multifunctional circuit can be implemented with limited circuit resources by dynamically reconfiguring the circuit configuration to efficiently use the hardware resources has come on the market. However, large-capacity ROM cannot be implemented on the semiconductor device in the design assuming the use of large-capacity ROM and thus it is difficult to take advantage.

It is therefore an object of the invention to provide a wipe pattern generation apparatus that can generate wipe patterns of various shapes at high speed and moreover can be miniaturized.

Means for Solving the Problems

A wipe pattern generation apparatus of the invention is a wipe pattern generation apparatus for inputting position information corresponding to each pixel on a display screen as polar coordinate data represented by a combination of angle data θ and distance data r from the polar coordinate center and outputting the comparison result between the polar coordinate data and predetermined pattern information, and includes a sin θ calculation section for calculating sin θ from the input angle data θ; a first multiplication section for multiplying the calculation result of sin θ by a first coefficient; a cos θ calculation section for calculating cos θ from the angle data θ ; a second multiplication section for multiplying the calculation result of cos θ by a second coefficient; a third multiplication section for multiplying the result of adding output of the first multiplication section and output of the second multiplication section by a third coefficient and outputting as a reciprocal of the distance from the polar coordinate center to an arbitrary line on the display screen; a fourth multiplication section for multiplying output of the third multiplication section by the distance data r; and a comparison section for making a comparison between output of the fourth multiplication section and a fourth coefficient.

In the above-described configuration, calculation of sin θ, calculation of cos θ, multiplication, and addition are performed in combination based on the input angle data θ, whereby the contour positions of a wipe pattern formed of an arbitrary line and the wipe pattern is generated. The first coefficient, the second coefficient, and the third coefficient are changed appropriately, whereby wipe patterns corresponding to various line patterns can be generated. Therefore, the required memory capacity can be drastically reduced and it is also made possible to execute generation of a wipe pattern at high speed.

A wipe pattern generation apparatus of the invention is a wipe pattern generation apparatus for inputting position information corresponding to each pixel on a display screen as polar coordinate data represented by a combination of angle data θ and distance data r from the polar coordinate center and outputting the comparison result between the polar coordinate data and predetermined pattern information, and includes a dynamic reconfiguration device including a digital signal processing function; a first circuit configuring section for configuring in the dynamic reconfiguration device a first circuit having a sin θ calculation section for calculating sin θ from the input angle data θ, a first multiplication section for multiplying the calculation result of sin θ by a first coefficient, a cos θ calculation section for calculating cos θ from the angle data θ, a second multiplication section for multiplying the calculation result of cos θ by a second coefficient, and a third multiplication section for multiplying the result of adding output of the first multiplication section and output of the second multiplication section by a third coefficient for calculating a reciprocal of the distance from the polar coordinate center to an arbitrary line on the display screen; a second circuit configuring section for configuring in the dynamic reconfiguration device a second circuit having memory for retaining a reciprocal of discrete distance data from the polar coordinate center corresponding to the high-order bits of the angle data θ to an arbitrary curve and an interpolation section for interpolating output of the memory using the angle data θ; a configuration switching section for determining the angle range to which the angle data θ belongs, controlling the first circuit configuring section and the second circuit configuring section in response to the range of the angle data θ, and dynamically switching between the first circuit and the second circuit; and a comparison section for making a comparison between the result of multiplying output of the first circuit or output of the second circuit by the distance data r of the polar coordinates and a fourth coefficient.

In the above-described configuration, the dynamic reconfiguration (RCF: Reconfigurable Compute Fabric) device is adopted, whereby the limited hardware resources are effectively used for making it possible to implement a multifunctional circuit. The first circuit configured in the dynamic reconfiguration device is provided with the sin θ calculation section, the first multiplication section, the cos θ calculation section, the second multiplication section, and the third multiplication section for calculating the reciprocal of the distance from the polar coordinate center to an arbitrary line on the display screen. The second circuit configured in the dynamic reconfiguration device is provided with the memory for retaining the reciprocal of the discrete distance data from the polar coordinate center corresponding to the high-order bits of the angle data θ to an arbitrary curve and the interpolation section for interpolating output of the memory using the angle data θ. The configuration switching section determines the angle range to which the angle data θ belongs, controls the first circuit configuring section and the second circuit configuring section in response to the range of the angle data θ, and dynamically switches between the first circuit and the second circuit.

The first circuit is a circuit for generating a line pattern and can generate a line pattern by calculation without using large-capacity ROM. The second circuit is a circuit for generating a curve pattern and can generate a curve pattern using the memory and the interpolation section in combination without using large-capacity ROM. Further, the line generated by the first circuit and the curve generated by the second circuit are used in combination, whereby the number of types of patterns that can be generated can be increased drastically. As the configuration switching section dynamically switches between the first circuit and the second circuit, the line generated by the first circuit and the curve generated by the second circuit can be combined in a various manner in response to the range of the angle data θ. Accordingly, a wipe pattern generation apparatus that can generate various wipe patterns at high speed and moreover can be easily miniaturized can be realized.

A wipe pattern generation apparatus of the invention is a wipe pattern generation apparatus for inputting position information corresponding to each pixel on a display screen as polar coordinate data represented by a combination of angle data θ and distance data r from the polar coordinate center and outputting the comparison result between the polar coordinate data and predetermined pattern information, and includes a dynamic reconfiguration device including a digital signal processing function; a second circuit configuring section for configuring in the dynamic reconfiguration device a second circuit having memory for retaining a reciprocal of discrete distance data from the polar coordinate center corresponding to the high-order bits of the angle data θ to a first curve and an interpolation section for interpolating output of the memory using the angle data θ; a third circuit configuring section for configuring in the dynamic reconfiguration device a third circuit having memory for retaining a reciprocal of discrete distance data from the polar coordinate center corresponding to the high-order bits of the angle data θ to a second curve and an interpolation section for interpolating output of the memory using the angle data θ; a configuration switching section for determining the angle range to which the angle data θ belongs, controlling the second circuit configuring section and the third circuit configuring section in response to the range of the angle data θ, and dynamically switching between the second circuit and the third circuit; and a comparison section for making a comparison between the result of multiplying output of the second circuit or output of the third circuit by the distance data r of the polar coordinates and a fourth coefficient.

In the above-described configuration, the second circuit configured in the dynamic reconfiguration device is provided with the memory for retaining the reciprocal of the discrete distance data from the polar coordinate center corresponding to the high-order bits of the angle data θ to a first curve and the interpolation section for interpolating output of the memory using the angle data θ. The third circuit is provided with the memory for retaining the reciprocal of the discrete distance data from the polar coordinate center corresponding to the high-order bits of the angle data θ to a second curve and the interpolation section for interpolating output of the memory using the angle data θ. The configuration switching section determines the angle range to which the angle data θ belongs, controls the second circuit configuring section and the third circuit configuring section in response to the range of the angle data θ, and dynamically switches between the first circuit and the second circuit.

The second circuit is a circuit for generating a first curve pattern and the third circuit is a circuit for generating a second curve pattern. The second circuit and the third circuit can generate curve patterns using the memory and the interpolation section in combination without using large-capacity ROM. Further, the first curve pattern generated by the second circuit and the second curve pattern generated by the third circuit are used in combination, whereby the number of types of patterns that can be generated can be increased drastically. As the configuration switching section dynamically switches between the second circuit and the third circuit, the first curve pattern generated by the second circuit and the second curve pattern generated by the third circuit can be combined in a various manner in response to the range of the angle data θ. Accordingly, a wipe pattern generation apparatus that can generate various wipe patterns at high speed and moreover can be easily miniaturized can be realized.

Advantages of the Invention

According to the invention, there can be provided a wipe pattern generation apparatus that can generate wipe patterns of various shapes at high speed and moreover can be miniaturized.

BRIEF DESCRIPTION OF THE DRAWINGS

FIG. 31 is a schematic drawing to show an example of data retained in memory in the wipe pattern generation apparatus in the related art example.

DESCRIPTION OF REFERENCE NUMERALS

| Best Mode for Carrying out the Invention | |
|---|---|
| 100 | Wiper pattern generation apparatus |
| 101 | Sin θ generation section |
| 102 | Cos θ generation section |
| 103, 104 | Multiplier |
| 105 | Adder |
| 106, 107 | Multiplier |
| 108 | Comparator |
| 110 | Wipe pattern output data |
| 150 | Display screen |
| 151 | x coordinate |
| 152 | y coordinate |
| 153 | Polar coordinate origin |
| R1, R2, R3, R4 | Coefficient |
| r | Distance information |
| θ | Angle information |
| 201 | Sin θ calculation section |
| 202 | Cos θ calculation section |
| 204, 206, 210, 211 | Multiplier |
| 208 | Adder |
| 212 | First circuit |
| 221 | Curve 1 table |
| 222 | Curve 1 linear interpolation coefficient table |
| 223 | Multiplier |
| 224 | Second circuit |
| 225 | First interpolation circuit |
| 226 | Adder |
| 231 | θ range detection section |
| 232, 232B | Circuit configuration switching section |
| 241 | Curve 2 table |
| 242 | Curve 2 linear interpolation coefficient table |
| 243 | Multiplier |
| 244 | Adder |
| 245 | Third circuit |
| 246 | Second interpolation circuit |
| 254 | θ coordinate |
| 255 | r coordinate |
| 259 | Comparator |
| 260 | Wipe pattern output data |
| 261 | Polar coordinate origin |
| 301 | Sin θ table |
| 302 | Sin θ linear interpolation coefficient table |
| 303 | Multiplier |
| 304 | Adder |
| 401 | Cos θ table |
| 402 | Cos θ linear interpolation coefficient table |
| 403 | Multiplier |
| 404 | Adder |
| R1, R2, R3, R4 | Coefficient |
| RCF | Dynamic reconfiguration device |

A wipe pattern generation apparatus of an embodiment is used with a video processing apparatus, etc., like the wipe pattern generation apparatus in the related art and can be used to partition a screen area according to a generated pattern to display a moving image like TV broadcasting on a screen, for example.

First Embodiment

Figure 1:
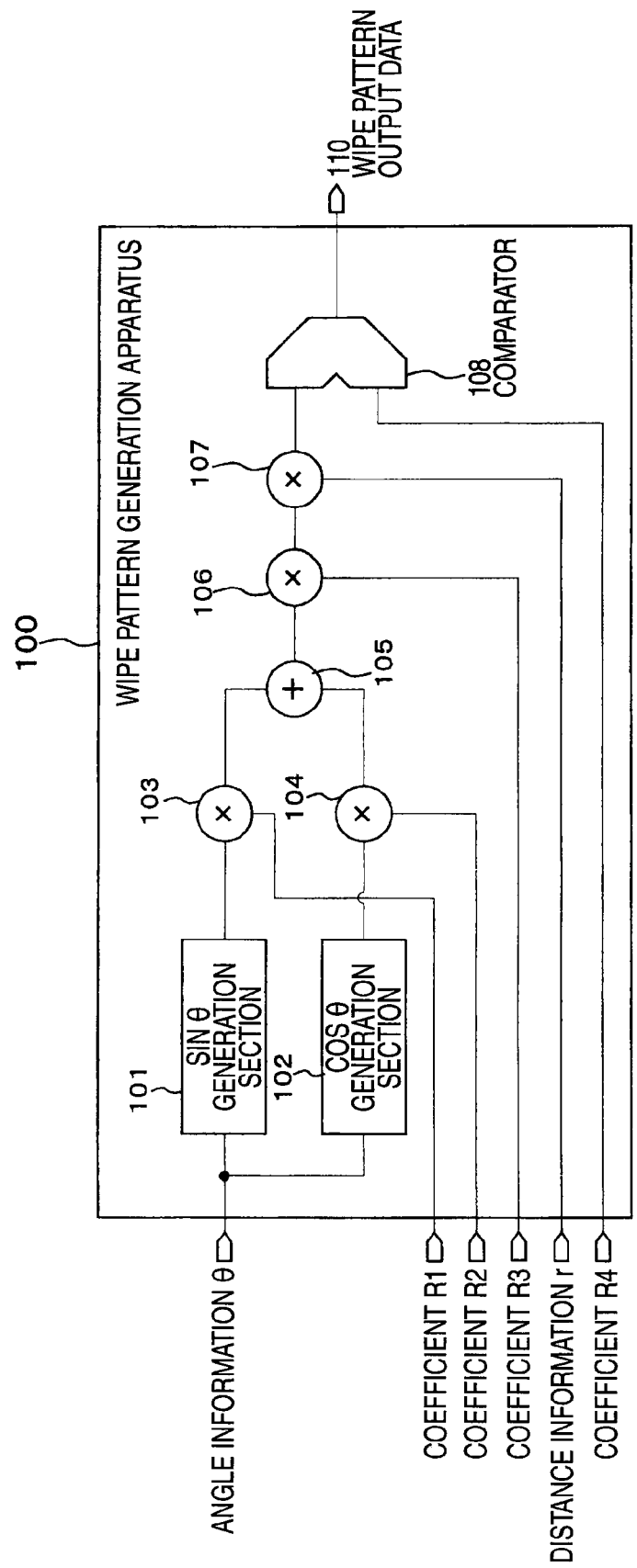
FIG. 1 is a block diagram to show the configuration of a wipe pattern generation apparatus according to a first embodiment of the invention.

FIG. 1 is a block diagram to show the configuration of a wipe pattern generation apparatus according to a first embodiment of the invention. A wipe pattern generation apparatus 100 of the embodiment is made up of a sin θ generation section 101, a cos θ generation section 102, a multiplier 103, a multiplier 104, an adder 105, a multiplier 106, a multiplier 107, and a comparator 108.

Information representing each pixel position obtained by scanning over a display screen in sequence in an x coordinate 151 direction and a y coordinate 152 direction by polar coordinates, namely, angle information θ and distance information r are input to the wipe pattern generation apparatus 100. In addition, the numeric values of coefficients R1, R2, R3, and R4 for determining the characteristic of the wiper pattern to be generated are also input to the wipe pattern generation apparatus 100.

The sin θ generation section 101 calculates data of sin θ from the input angle information θ of polar coordinates. The cos θ generation section 102 calculates data of cos θ from the input angle information θ of polar coordinates. The sin θ generation section 101 and the cos θ generation section 102 can be implemented by using memory previously retaining calculation result data, for example. The memory capacity can also be reduced using them and an interpolation circuit in combination.

The multiplier 103 multiplies the data output by the sin θ generation section 101 by the coefficient R1 and outputs the result. The multiplier 104 multiplies the data output by the cos θ generation section 102 by the coefficient R2 and outputs the result. The adder 105 outputs the result of adding the output value of the multiplier 103 and the output value of the multiplier 104. The multiplier 106 multiplies the output value of the adder 105 by the coefficient R3 and outputs the result. The value output by the multiplier 106 corresponds to the reciprocal of distance information from a polar coordinate origin 153 to an arbitrary line on a display screen 150.

The multiplier 107 multiplies the value output by the multiplier 106 by the distance information r input to the wipe pattern generation apparatus 100 and outputs the result. The comparator 108 makes a comparison between the value output by the multiplier 107 and the coefficient R4 and outputs the result as wipe pattern output data 110.

Figure 2:
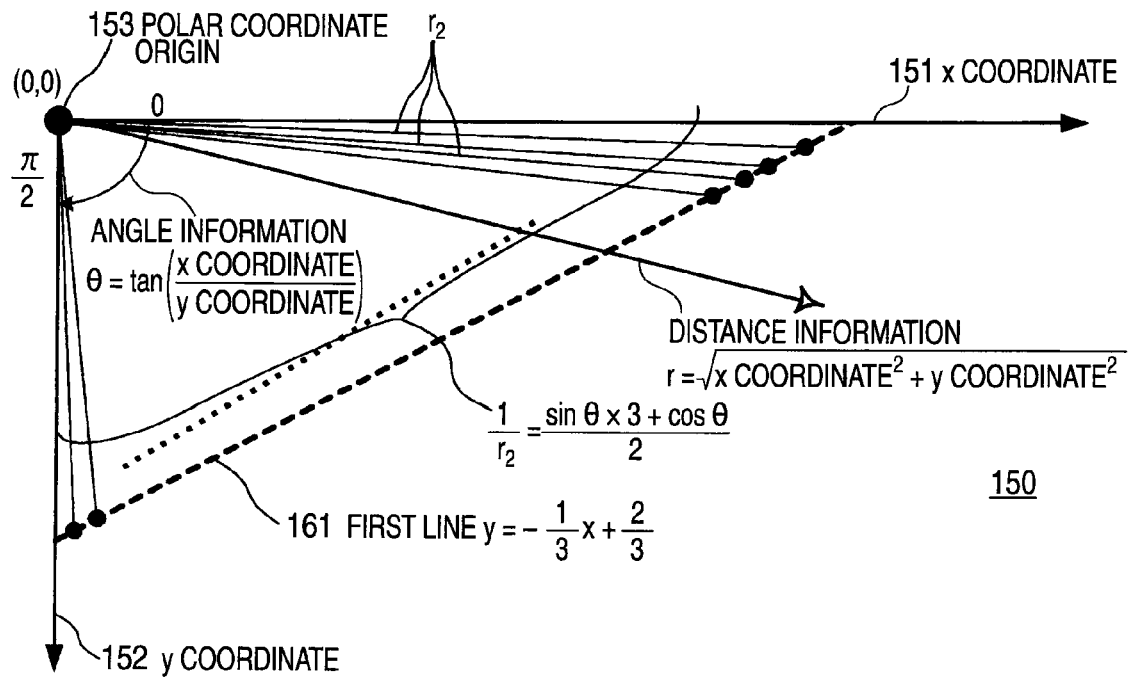
FIG. 2 is a schematic drawing to show a generation procedure of a first line in the first embodiment
Figure 3:
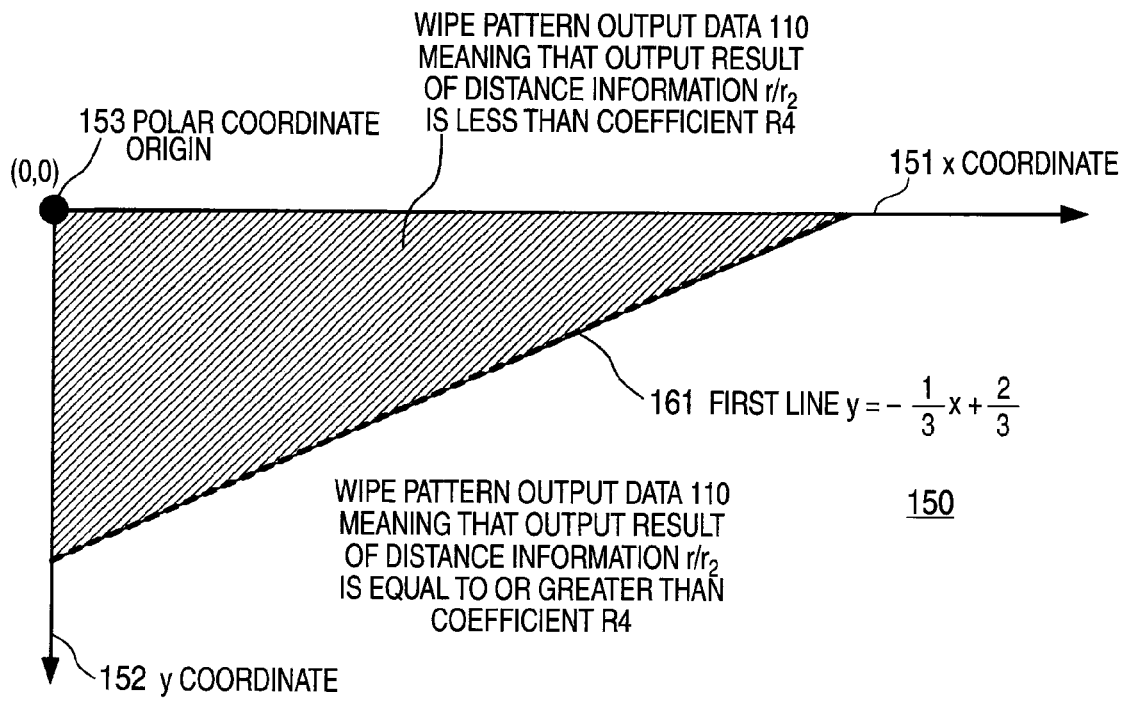
FIG. 3 is a schematic drawing to represent wipe pattern output data corresponding to the first line in FIG. 2.
Figure 4:
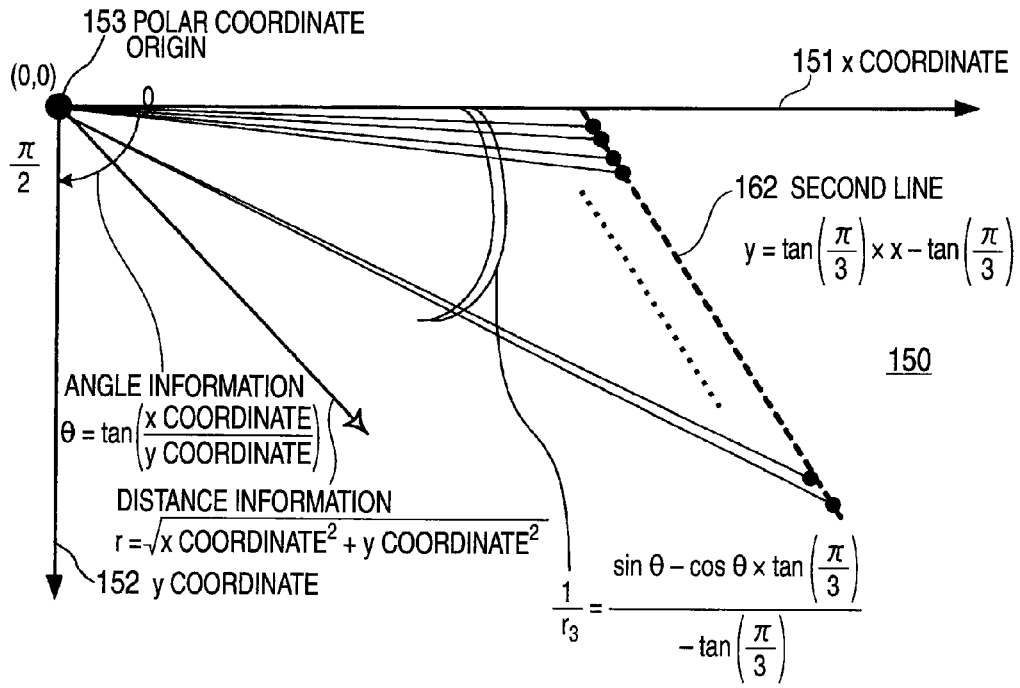
FIG. 4 is a schematic drawing to show a generation procedure of a second line in the first embodiment

Next, the specific operation of the wipe pattern generation apparatus 100 of the embodiment in generating an actual wipe pattern will be discussed. FIG. 2 is a schematic drawing to show a generation procedure of a first line in the first embodiment, and FIG. 3 is a schematic drawing to represent wipe pattern output data corresponding to the first line in FIG. 2. FIG. 4 is a schematic drawing to show a generation procedure of a second line in the first embodiment, and FIG. 5 is a schematic drawing to represent wipe pattern output data corresponding to the second line in FIG. 4.

Figure 5:
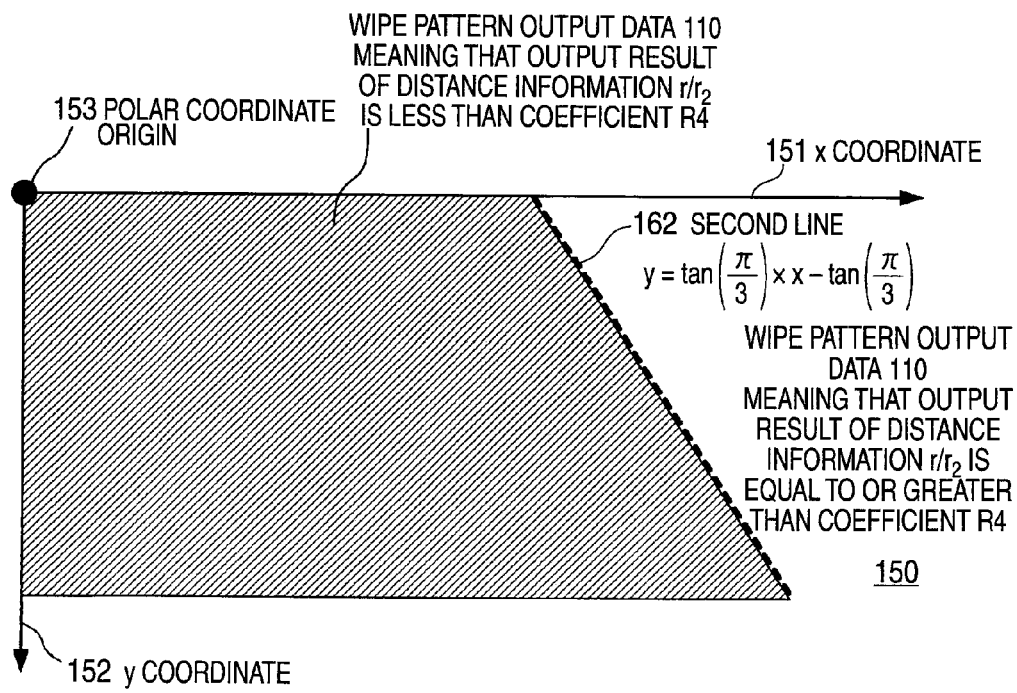
FIG. 5 is a schematic drawing to represent wipe pattern output data corresponding to the second line in FIG. 4.

The embodiment assumes the case where a linear wipe pattern as shown in FIGS. 3 and 5 is applied to a display screen. In FIGS. 3 and 5, a pixel position in a horizontal direction in the display screen is represented by the x coordinate 151 and a pixel position in a vertical direction is represented by the y coordinate 152.

The example of the first line shown in FIGS. 2 and 3 assumes the case where the position of x coordinate 151, y coordinate 152 (0, 0) is defined as the polar coordinate origin 153 and a first line 161 is generated as a wipe pattern. Here, the first line 161 is represented by a function of $(y=-(1/3)x+2/3)$.

As shown in FIG. 2, to represent distance r from the polar coordinate origin 153 to a point on the first line 161 as $r_2$, the reciprocal of the distance $r_2$ ($1/r_2$) is found according to the following (1) expression:

[Expression 1]

$$y = x \times \tan\theta \quad (1)$$

$$x \times \tan\theta = -\frac{1}{3}x + \frac{2}{3}$$

$$x = \frac{2}{\tan\theta \times 3 + 1}$$

$$1/r_2 =$$

$$\frac{1}{r} = \frac{1}{\sqrt{x^2+y^2}} = \frac{1}{\sqrt{x^2+(1+\tan^2\theta)}} = \frac{\cos\theta}{x} = \frac{\sin\theta \times 3 + \cos\theta}{2}$$

Therefore, if the wipe pattern generation apparatus 100 in FIG. 1 executes computation corresponding to (1) expression shown above, a wipe pattern corresponding to the first line 161 in FIG. 2 can be generated. In fact, "3," "1," and "½" are assigned to the coefficients R1, R2, and R3, respectively, given to the wipe pattern generation apparatus 100 according to the coefficients of (1) expression, whereby a wipe pattern corresponding to the first line 161 can be generated.

The generation condition of actual wipe pattern output data 110 is determined in response to the coefficient R4. That is, the comparator 108 outputs the comparison result between (r/r₂) and R4 as the wipe pattern output data 110 as shown in FIG. 3. As the simplest example, it is possible to assign "1" to the coefficient R4.

Therefore, in fact, the wipe pattern output data 110 as shown in FIG. 3 is obtained. This means that the display screen is partitioned into two areas with the first line 161 of the generated wipe pattern as the boundary. The wipe pattern output data 110 (1 or 0) indicates which of the two areas the position of the polar coordinates input to the wipe pattern generation apparatus 100 belongs to.

The example of the second line shown in FIGS. 4 and 5 assumes the case where the position of x coordinate 151, y coordinate 152 (0, 0) is defined as the polar coordinate origin 153 and a second line 162 different in inclination from the first line 161 is generated as a wipe pattern. Here, the second line 162 is represented by a function of (y=tan (π/3)×x−tan (π/3)).

As shown in FIG. 4, to represent distance r from the polar coordinate origin 153 to a point on the second line 162 as r₃, the reciprocal of the distance r₃ (1/r₃) is found according to the following (2) expression:

[Expression 2]

$$y = x \times \tan\theta\left(\frac{\pi}{3}\right) \times x - \tan\left(\frac{\pi}{3}\right) \quad (2)$$

$$x \times \left(\tan\theta - \tan\left(\frac{\pi}{3}\right)\right) \times x = -\tan\left(\frac{\pi}{3}\right)$$

$$x = \frac{-\tan\left(\frac{\pi}{3}\right)}{\tan\theta - \tan\left(\frac{\pi}{3}\right)}$$

$$1/r_3 =$$

$$\frac{1}{r} = \frac{1}{\sqrt{x^2+y^2}} = \frac{1}{\sqrt{x^2+(1+\tan^2\theta)}} = \frac{\cos\theta}{x} = \frac{\sin\theta - \cos\theta \times \left(\frac{\pi}{3}\right)}{-\tan\left(\frac{\pi}{3}\right)}$$

Therefore, if the wipe pattern generation apparatus 100 in FIG. 1 executes computation corresponding to (2) expression shown above, a wipe pattern corresponding to the second line 162 in FIG. 4 can be generated. In fact, "1," "−tan (π/3)," and "−1/(tan (π/3))" are assigned to the coefficients R1, R2, and R3, respectively, given to the wipe pattern generation apparatus 100 according to the coefficients of (2) expression, whereby a wipe pattern corresponding to the second line 162 can be generated.

The generation condition of actual wipe pattern output data 110 is determined in response to the coefficient R4. That is, the comparator 108 outputs the comparison result between (r/r₃) and R4 as the wipe pattern output data 110 as shown in FIG. 5. As the simplest example, it is possible to assign "1" to the coefficient R4.

Therefore, in fact, the wipe pattern output data 110 as shown in FIG. 5 is obtained. This means that the display screen is partitioned into two areas with the second line 162 of the generated wipe pattern as the boundary. The wipe pattern output data 110 (1 or 0) indicates which of the two areas the position of the polar coordinates input to the wipe pattern generation apparatus 100 belongs to.

As described above, the wipe pattern generation apparatus 100 of the embodiment can generate a wipe pattern implemented as a line at high speed by calculation without using large-capacity memory. Various wipe patterns can be generated by changing the input coefficients appropriately.

In the description of the embodiment given above, the position where the x coordinate 151 is "0" and the y coordinate 152 is "0" is defined as the polar coordinate origin 153 and the angle information θ is limited to "0 to π/2," but the range of the angle information θ is also changed as required depending on the difference of the position assigned as the polar coordinate origin 153.

In the embodiment described above, only the case where the first line 161 or the second line 162 of a simple line is made a wipe pattern has been described, but a little more complicated pattern can also be generated. For example, the range of the input angle information θ is partitioned into a plurality of areas and processing of turning back a line pattern generated for each area is performed, whereby a plurality of symmetrical lines can also be combined to generate a polygonal wipe pattern.

A pattern other than the first line 161 or the second line 162 described above can also be generated by changing the value of the coefficient R1, R2, R3 input to the wipe pattern generation apparatus 100. In the embodiment described above, only the case where the value of the coefficient R4 is "1" has been described, but the wipe pattern can be scaled up or down with the polar coordinate origin as the center.

According to the wipe pattern generation apparatus of the first embodiment described above, calculation of sin θ, calculation of cos θ, multiplication, and addition are performed in combination based on the input angle data θ, whereby the contour positions of a wipe pattern implemented as an arbitrary line can be found for generating the wipe pattern. As each coefficient is changed appropriately, wipe patterns corresponding to various line patterns can be generated. Thus, the required memory capacity can be drastically reduced for miniaturization and it is also made possible to execute generation of a wipe pattern at high speed. Therefore, the wipe pattern generation apparatus of the embodiment can generate various wipe patterns while satisfying the required conditions in an environment in which miniaturization and speeding up are required, and can be used widely in each field where video and image are produced, edited, etc.

Second Embodiment

Figure 6:
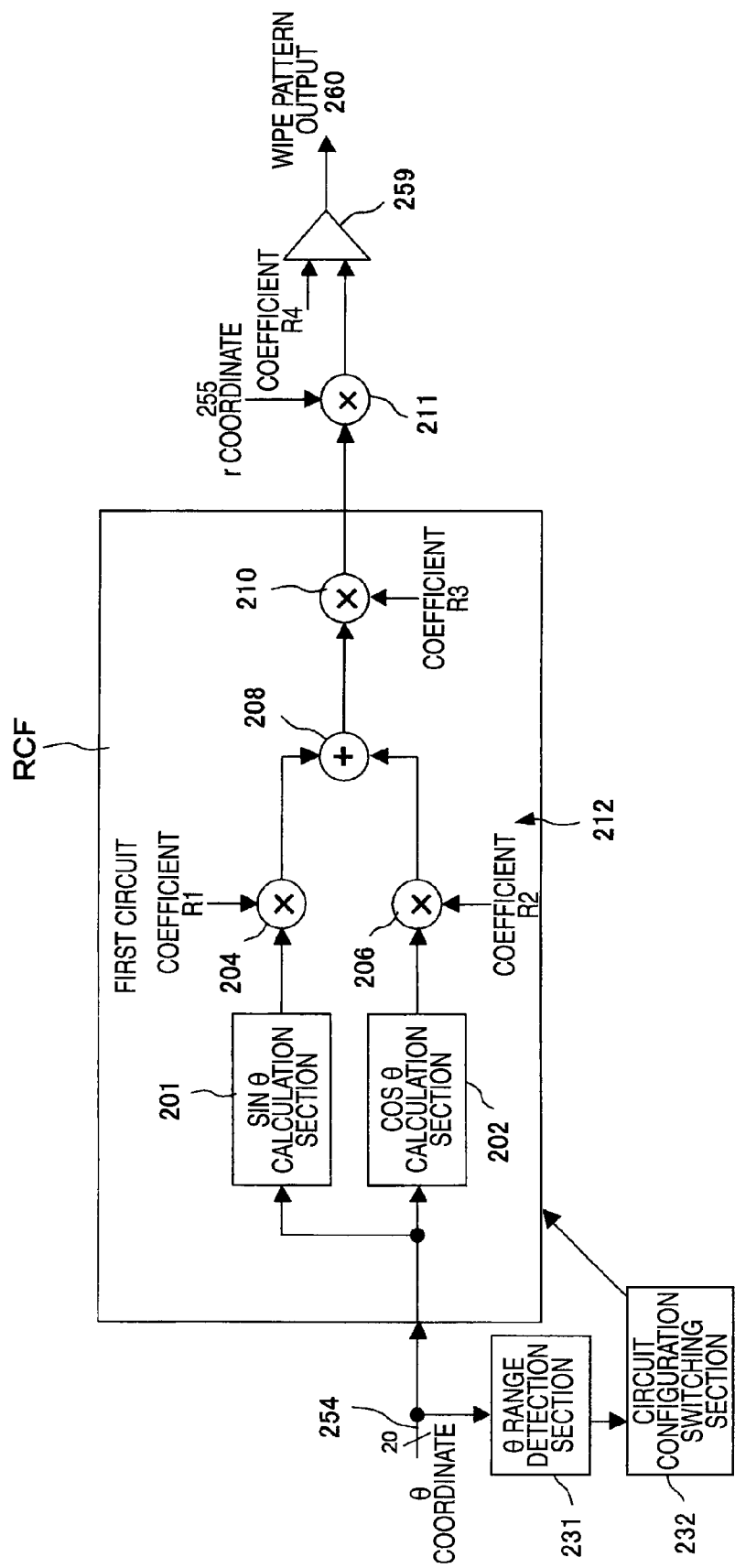
FIG. 6 is a block diagram to show a first configuration example of the main part of a wipe pattern generation apparatus according to a second embodiment of the invention.
Figure 7:
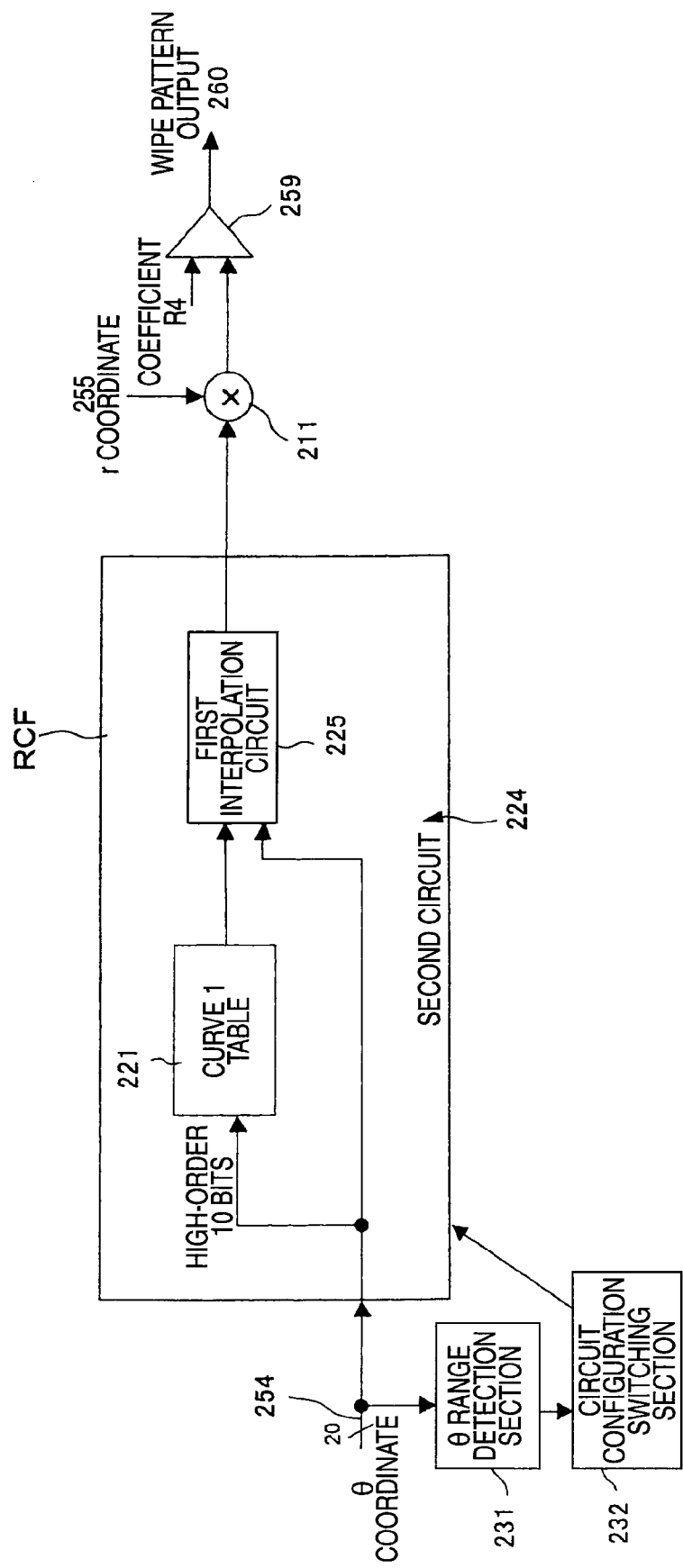
FIG. 7 is a block diagram to show a second configuration example of the main part of the wipe pattern generation apparatus according to the second embodiment of the invention.

FIG. 6 is a block diagram to show a first configuration example of the main part of a wipe pattern generation apparatus according to a second embodiment of the invention, and FIG. 7 is a block diagram to show a second configuration example of the main part of the wipe pattern generation apparatus according to the second embodiment of the invention.

The wipe pattern generation apparatus includes a θ range detection section 231, a circuit configuration switching section 232, a dynamic reconfiguration (Reconfigurable Compute Fabric) device RCF, a multiplier 211, and a comparator 259. In the wipe pattern generation apparatus of the second embodiment, the function of a first circuit 212 is implemented in the dynamic reconfiguration device RCF as shown in FIG. 6 under one condition and the function of a second circuit 224 is implemented in the dynamic reconfiguration device RCF as shown in FIG. 7 under another condition as described later.

Figure 8:
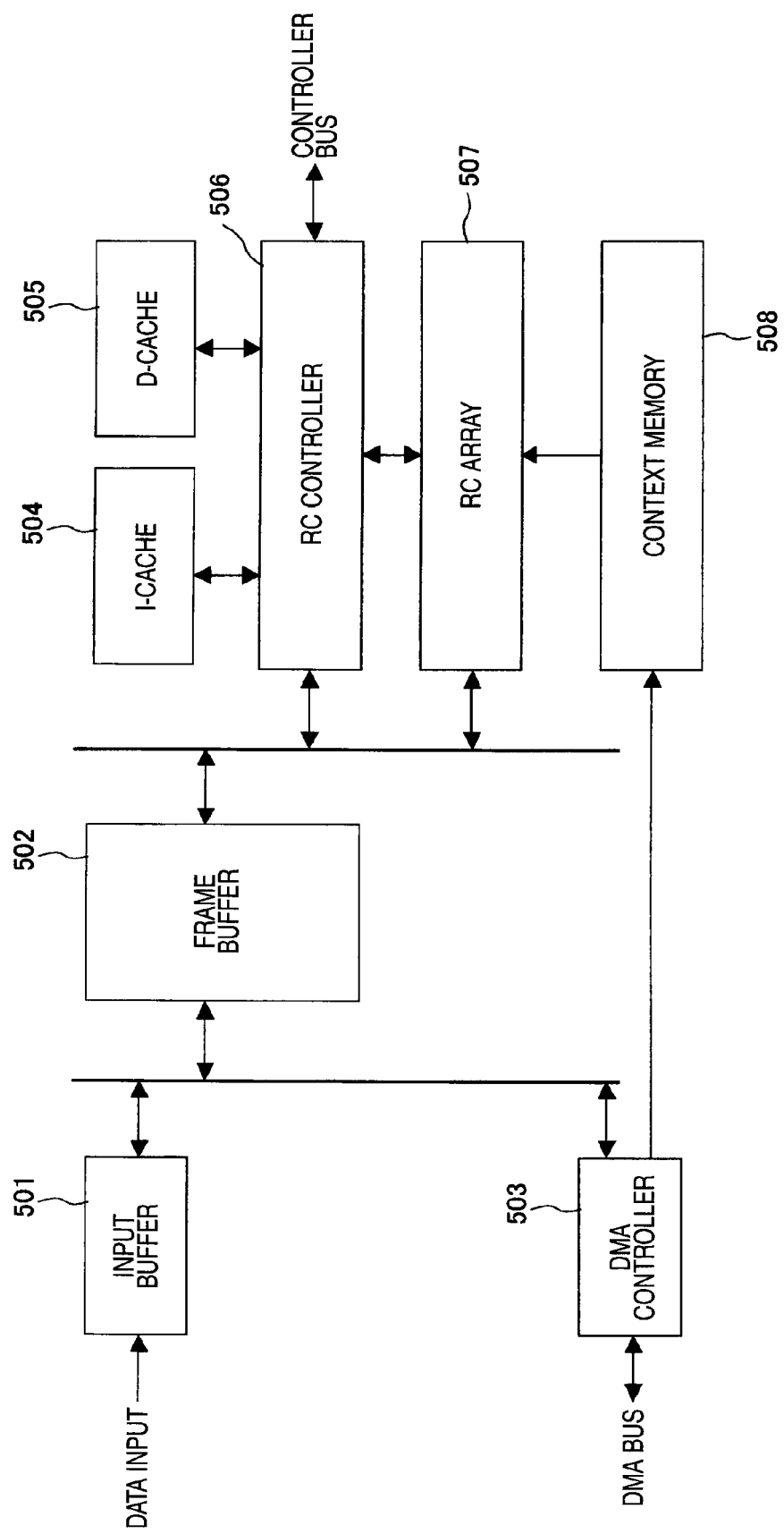
FIG. 8 is a block diagram to show a configuration example of a dynamic reconfiguration device.

For example, MRC6011 manufactured by Motorola can be used as the dynamic reconfiguration device RCF. FIG. 8 is a block diagram to show a configuration example of the dynamic reconfiguration device; it shows the schematic configuration of MRC6011. The dynamic reconfiguration device RCF is implemented as a reconfigurable digital signal processor (DSP), and includes an input buffer 501, a frame buffer 502, a DMA controller 503, an I-cache 504, a D-cache 505, an RC controller 506, an RC array 507, and context memory 508. The RC array 507 having a large number of reconfigurable cells RC for performing arithmetic and logic operations is provided in the dynamic reconfiguration device RCF and the reconfigurable cells RC are connected like an array through a data bus. The RC controller 506 is provided for controlling a large number of reconfigurable cells RC. Further, to store wide band data, memory buffers are provided as the input buffer 501 and the frame buffer 502.

In the dynamic reconfiguration device RCF, the contents of a context stored in the context memory 508 as an instruction executed by the RC array 507 are controlled, whereby the function of the RC array 507 can be switched. This means that the functional circuit configuration can be reconfigured in the dynamic reconfiguration device RCF.

Figure 9:
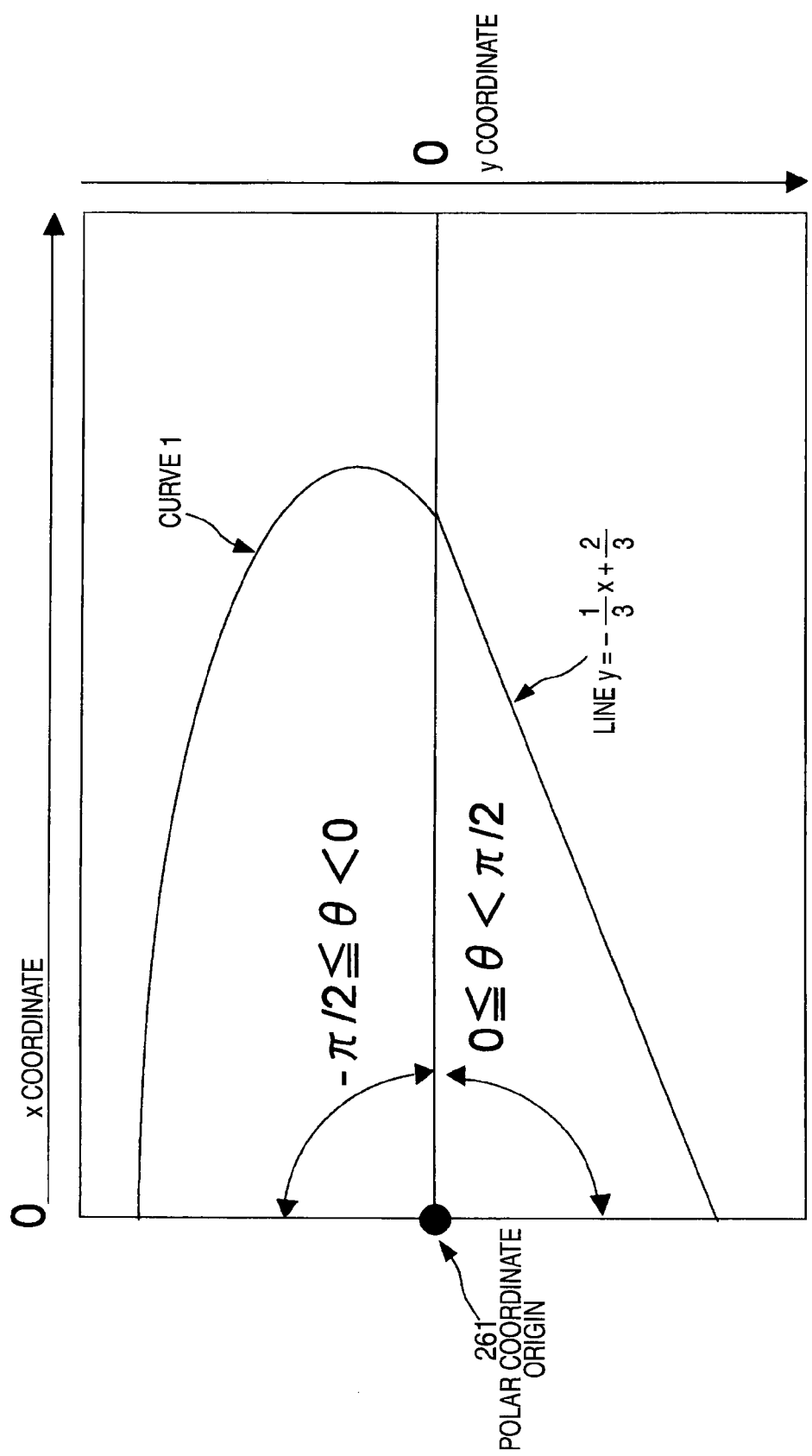
FIG. 9 is a schematic drawing to show a specific example of a wipe pattern in the wipe pattern generation apparatus of the second embodiment.

FIG. 9 is a schematic drawing to show a specific example of a wipe pattern in the wipe pattern generation apparatus of the second embodiment. The embodiment assumes the case where a wipe pattern as shown in FIG. 9 is applied to a display screen. In FIG. 9, a pixel position in a horizontal direction in the display screen is an x coordinate and a pixel position in a vertical direction is a y coordinate and the origin of the x coordinate is the upper left corner of the screen and the origin of the y coordinate is the center of the screen. A corresponding polar coordinate origin 261 is positioned at the left center of the screen. The wipe pattern shown in FIG. 9 is formed of a combination of a curve 1 and a line (y=−(⅓)x+⅔).

Information corresponding to the pixel coordinates (x coordinate, y coordinate) of the scan position in the display screen is input to the wipe pattern generation apparatus as polar coordinates. The polar coordinates are made up of a combination of an r coordinate 255 representing the distance from the polar coordinate origin 261 and a θ coordinate 254 representing the angle relative to the reference axis. In the example shown in FIG. 6, the θ coordinate 254 is input as 20-bit parallel binary data.

The θ range detection section 231 determines the range of the angle to which the input θ coordinate 254 belongs. Specifically, the θ range detection section 231 determines whether or not a condition of $(0 \leq \theta < \pi/2)$ is satisfied and whether or not a condition of $(-\pi/2 \leq \theta < 0)$ is satisfied.

The circuit configuration switching section 232 controls the dynamic reconfiguration device RCF in accordance with the determination result of the θ range detection section 231 and dynamically switches the circuit configured in the dynamic reconfiguration device RCF. That is, if the input θ coordinate 254 satisfies the condition of $(0 \leq \theta < \pi/2)$, the circuit configuration switching section 232 configures the first circuit 212 of the configuration as shown in FIG. 6 in the dynamic reconfiguration device RCF; if the input θ coordinate 254 satisfies the condition of $(-\pi/2 \leq \theta < 0)$, the circuit configuration switching section 232 configures the second circuit 224 of the configuration as shown in FIG. 7 in the dynamic reconfiguration device RCF.

Output of the first circuit 212 or output of the second circuit 224 is connected to input of the multiplier 211. The multiplier 211 multiplies the output of the first circuit 212 or the second circuit 224 by the r coordinates 255 and outputs the result. The comparator 259 makes a comparison between the output value of the multiplier 211 and the coefficient R4 with respect to the greater-than, equal-to, less-than relation and outputs the result as wipe pattern output 260.

The first circuit 212 configured in the dynamic reconfiguration device RCF is made up of a sin θ calculation section 201, a cos θ calculation section 202, a multiplier 204, a multiplier 206, an adder 208, and a multiplier 210 as shown in FIG. 6. The sin θ calculation section 201 performs calculation processing of sin θ about the input θ coordinate 254. The cos θ calculation section 202 performs calculation processing of cos θ about the input θ coordinate 254.

The multiplier 204 multiplies output of the sin θ calculation section 201 by the coefficient R1 and outputs the result. The multiplier 206 multiplies output of the cos θ calculation section 202 by the coefficient R2 and outputs the result. The adder 208 adds the output of the multiplier 204 and the output of the multiplier 206 and outputs the result. The multiplier 210 multiplies the output of the adder 208 by the coefficient R3 and outputs the result.

Figure 12:
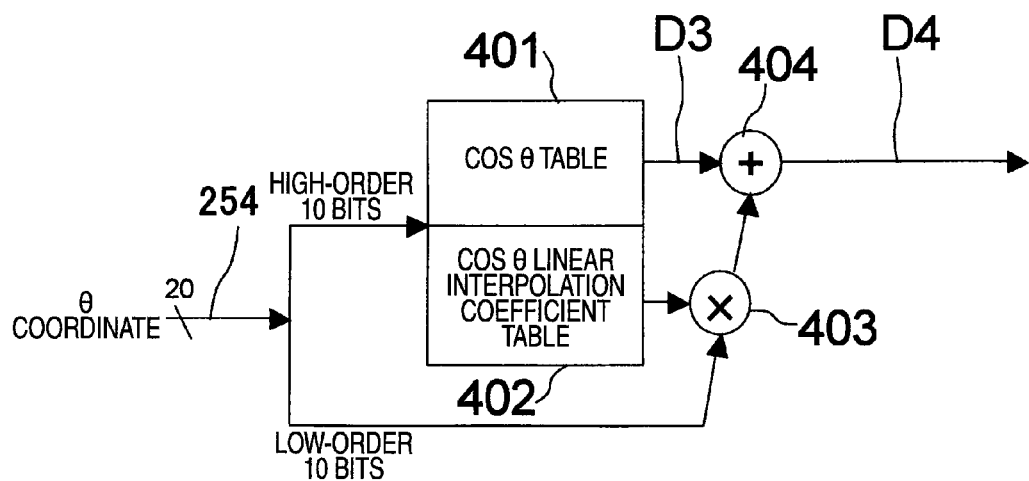
FIG. 12 is a block diagram to show the specific configuration of a cos θ calculation section shown in FIG. 6.

By the way, generally the calculation functions of sin θ and cos θ are realized using large-capacity ROM; however, large-capacity ROM cannot be implemented in the dynamic reconfiguration device RCF and if ROM is used, it becomes difficult to execute signal processing at high speed because the access speed to the memory is low. Then, in the embodiment, the sin θ calculation section 201 shown in FIG. 6 is implemented as a circuit of the configuration as shown in FIG. 10 and the cos θ calculation section 202 is implemented as a circuit of the configuration as shown in FIG. 12.

Figure 10:
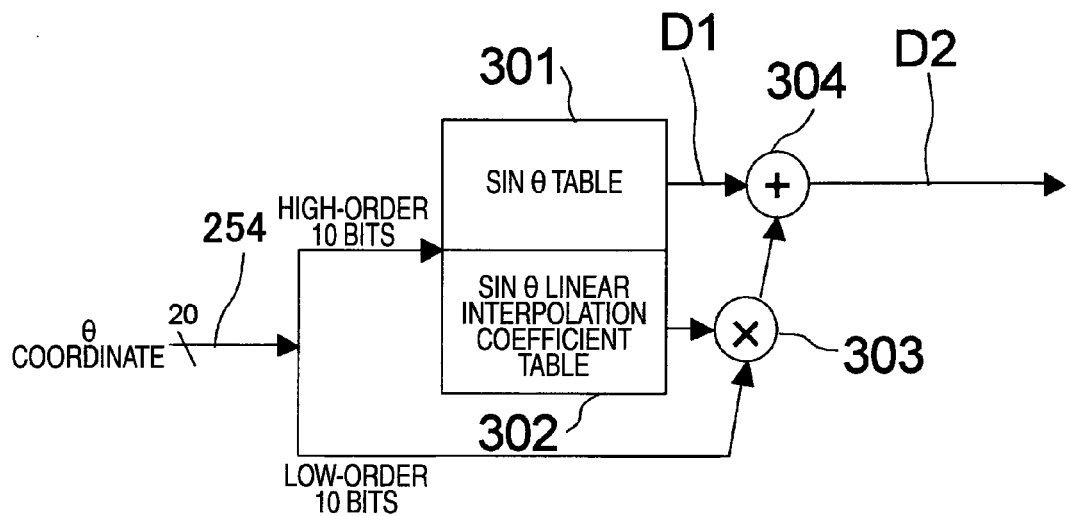
FIG. 10 is a block diagram to show the specific configuration of a sin θ calculation section shown in FIG. 6.
Figure 11:
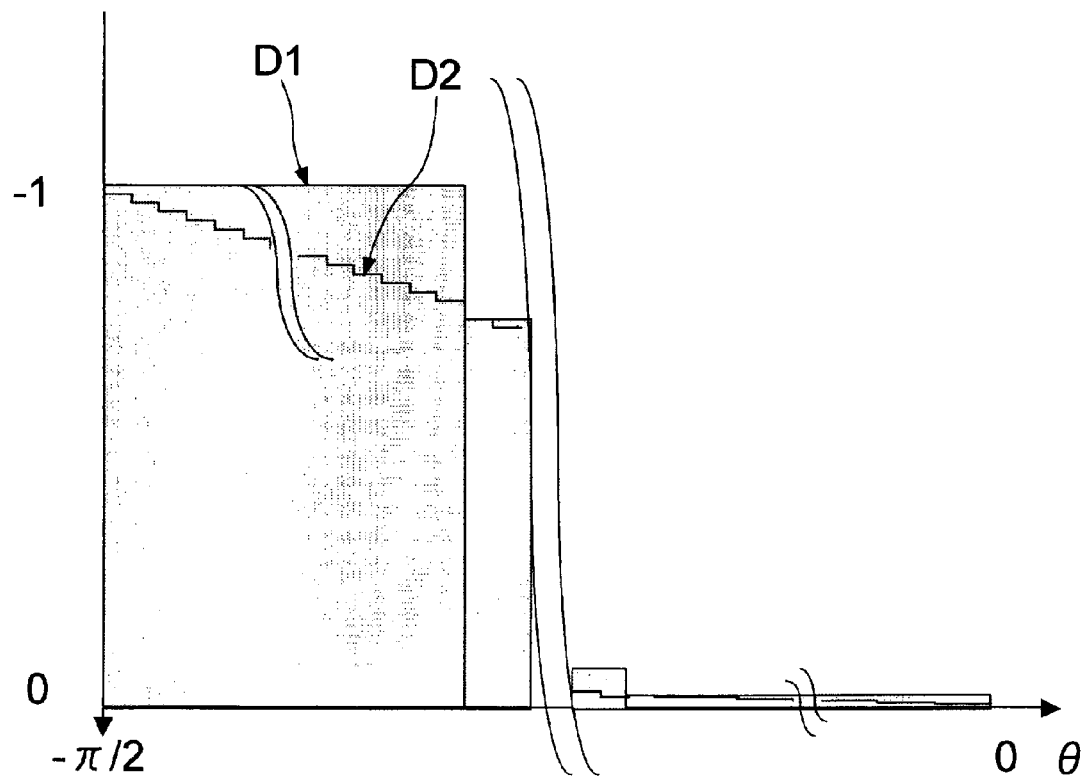
FIG. 11 is a graph to show an operation characteristic example of the sin θ calculation section in FIG. 10.
Figure 13:
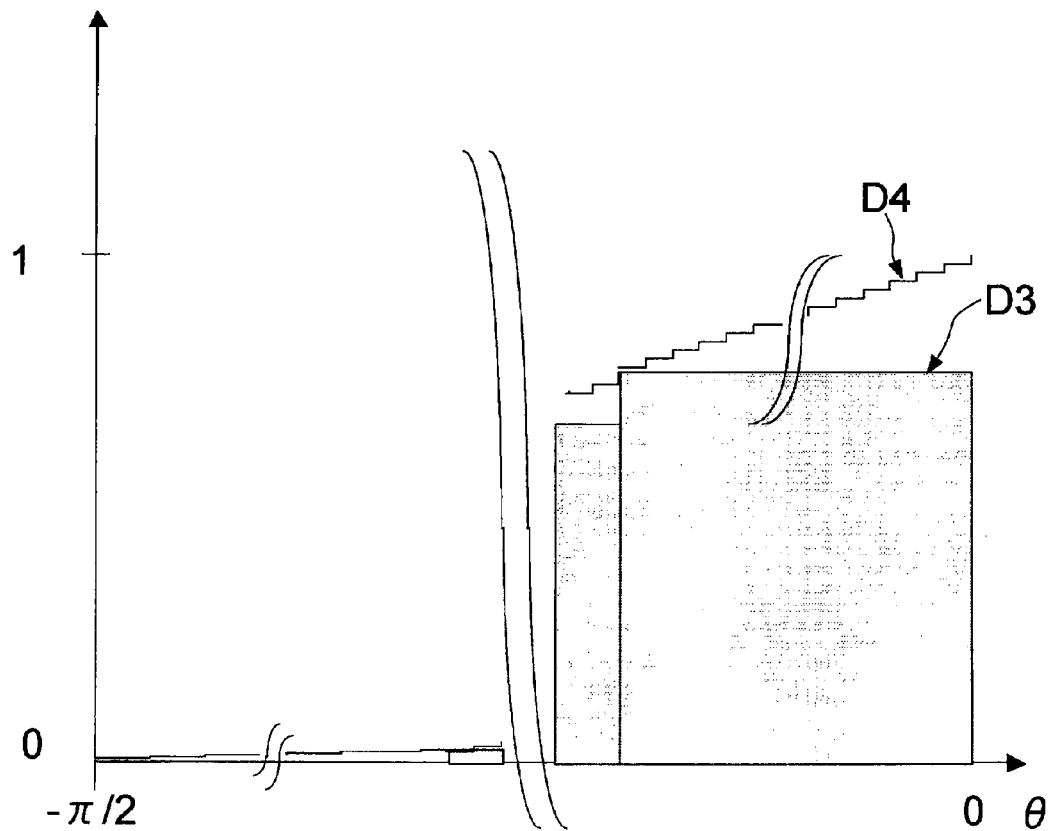
FIG. 13 is a graph to show an operation characteristic example of the cos θ calculation section in FIG. 12.

FIG. 10 is a block diagram to show the specific configuration of the sin θ calculation section shown in FIG. 6 and FIG. 11 is a graph to show an operation characteristic example of the sin θ calculation section in FIG. 10. FIG. 12 is a block diagram to show the specific configuration of the cos θ calculation section shown in FIG. 6 and FIG. 13 is a graph to show an operation characteristic example of the cos θ calculation section in FIG. 12.

As shown in FIG. 10, the sin θ calculation section 201 is made up of a sin θ table 301, a sin θ linear interpolation coefficient table 302, a multiplier 303, and an adder 304. The sin θ table 301 is implemented as memory and the calculation result of discrete sin θ assuming the case where the low-order 10 bits of the θ coordinate 254 having a 20-bit precision are all θ is retained in the address corresponding to the contents of the high-order 10 bits of the θ coordinate 254. Therefore, the high-order 10 bits of the θ coordinate 254 are given to the sin θ table 301, whereby the corresponding sin θ value can be read from the sin θ table 301 (see FIG. 11).

The sin θ linear interpolation coefficient table 302 is implemented as memory and the interpolation value corresponding to one step of the value of the low-order 10 bits of the θ coordinate 254 is retained. As for the interpolation value, the appropriate value varies in response to the contents of the high-order 10 bits of the θ coordinate 254 and thus different interpolation values are retained in the addresses associated with the high-order 10 bits of the θ coordinate 254. Therefore, the high-order 10 bits of the θ coordinate 254 are given to the sin θ linear interpolation coefficient table 302, whereby the appropriate interpolation value can be read from the sin θ linear interpolation coefficient table 302.

The multiplier 303 multiplies the interpolation value corresponding to one step output by the sin θ linear interpolation coefficient table 302 by the value of the low-order 10 bits of the θ coordinate 254 and outputs the result. The adder 304 adds the value output from the sin θ table 301 and the interpolation value output by the multiplier 303 and outputs the result as the liner-interpolated sin θ value (see FIG. 11).

The sin θ calculation section 201 configured as in FIG. 10 can handle the 20-bit θ coordinate 254 simply with two memory devices having an address corresponding to 10 bits and thus does not require large-capacity memory and can be implemented in a configurable size in the dynamic reconfiguration device RCF.

As shown in FIG. 12, the cos θ calculation section 202 is made up of a cos θ table 401, a cos θ linear interpolation coefficient table 402, a multiplier 403, and an adder 404. The cos θ calculation section 202 is implemented as memory and the calculation result of discrete cos θ assuming the case where the low-order 10 bits of the θ coordinate 254 having a 20-bit precision are all θ is retained in the address corresponding to the contents of the high-order 10 bits of the θ coordinate 254. Therefore, the high-order 10 bits of the θ coordinate 254 are given to the cos θ table 401, whereby the corresponding cos θ value can be read from the cos θ table 401 (see FIG. 13).

The cos θ linear interpolation coefficient table 402 is implemented as memory and retains the interpolation value corresponding to one step of the value of the low-order 10 bits of the θ coordinate 254. As for the interpolation value, the appropriate value varies in response to the contents of the high-order 10 bits of the θ coordinate 254 and thus different interpolation values are retained in the addresses associated with the high-order 10 bits of the θ coordinate 254. Therefore, the high-order 10 bits of the θ coordinate 254 are given to the cos θ linear interpolation coefficient table 402, whereby the appropriate interpolation value can be read from the cos θ linear interpolation coefficient table 402.

The multiplier 403 multiplies the interpolation value corresponding to one step output by the cos θ linear interpolation coefficient table 402 by the value of the low-order 10 bits of the θ coordinate 254 and outputs the result. The adder 404 adds the value output from the cos θ table 401 and the interpolation value output by the multiplier 403 and outputs the result as the liner-interpolated cos θ value (see FIG. 13).

The cos θ calculation section 202 configured as in FIG. 12 can handle the 20-bit θ coordinate 254 simply with two memory devices having an address corresponding to 10 bits and thus does not require large-capacity memory and can be implemented in a configurable size in the dynamic reconfiguration device RCF.

On the other hand, as shown in FIG. 7, the second circuit 224 implemented in the dynamic reconfiguration device RCF is made up of a curve 1 table 221 and a first interpolation circuit 225. The high-order 10 bits of the θ coordinate 254 are input to the curve 1 table 221 as a read address.

The curve 1 table 221 is implemented as memory and pattern data of a predetermined curve (curve 1) is retained in the address associated with the high-order 10 bits of the θ coordinate 254. Therefore, the θ coordinate 254 is given, whereby the pattern data of curve 1 corresponding to the θ coordinate 254 can be read from the curve 1 table 221. However, the data output by the curve 1 table 221 has only 10-bit precision of the θ coordinate 254. Then, the first interpolation circuit 225 is used to ensure a high precision.

Figure 14:
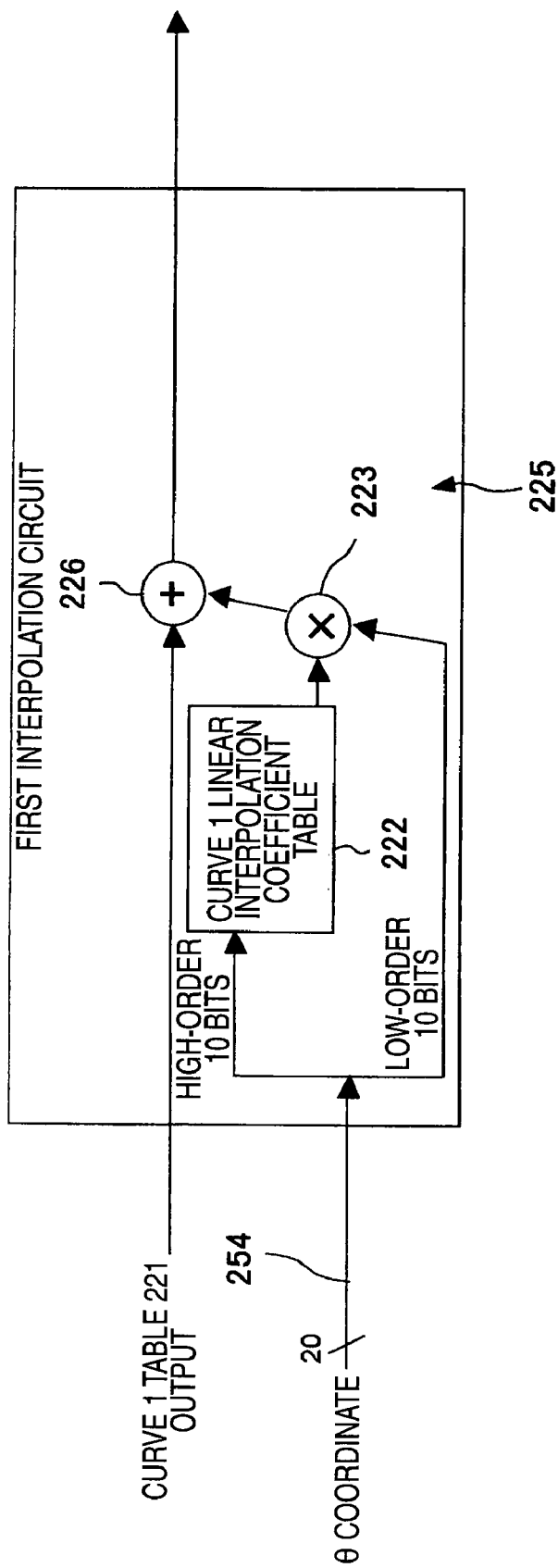
FIG. 14 is a block diagram to show the specific configuration of a first interpolation circuit shown in FIG. 7.

FIG. 14 is a block diagram to show the specific configuration of the first interpolation circuit shown in FIG. 7. The first interpolation circuit 225 is made up of a curve 1 linear interpolation coefficient table 222, a multiplier 223, and an adder 226. The curve 1 linear interpolation coefficient table 222 is implemented as memory and retains a coefficient corresponding to one step of θ for interpolation. Since an appropriate coefficient varies from one θ coordinate 254 to another, different coefficients are retained in the addresses associated with the high-order 10 bits of the θ coordinate 254. Therefore, the high-order 10 bits of the θ coordinate 254 are given as the read address of the curve 1 linear interpolation coefficient table 222, whereby the appropriate interpolation coefficient can be read from the curve 1 linear interpolation coefficient table 222.

The multiplier 223 multiplies the value output from the curve 1 linear interpolation coefficient table 222 by the value of the low-order 10 bits of the θ coordinate 254 and outputs the result. The adder 226 adds the value output from the curve 1 table 221 and the value output by the multiplier 223 and outputs the result as the liner interpolation result.

Next, the configuration and the operation to generate a specific wipe pattern in the second embodiment will be discussed. First, the case where the input θ coordinate 254 is in the range of (0≦θ<π/2) in the wipe pattern shown in FIG. 9, a pattern of a line represented by a function of (y=−(⅓)x+⅔) is generated using the first circuit 212 in FIG. 6 is assumed.

The distance from the polar coordinate origin 261 to an arbitrary point on the line (y=−(⅓)x+⅔) is represented as $r_1$ and its reciprocal ($1/r_1$) is found according to the following (3) expression:

[Expression 3]

$$y = x \times \tan\theta \quad (3)$$
$$x \times \tan\theta = \frac{1}{3}x + \frac{2}{3}$$
$$x = \frac{2}{\tan\theta \times 3 + 1}$$
$$1/r_1 = 1/\sqrt{x^2 + y^2} = 1/\sqrt{x^2 + (1 + \tan^2\theta)} = \frac{\cos\theta}{x} = \frac{\sin\theta \times 3 + \cos\theta}{2}$$

Figure 15:
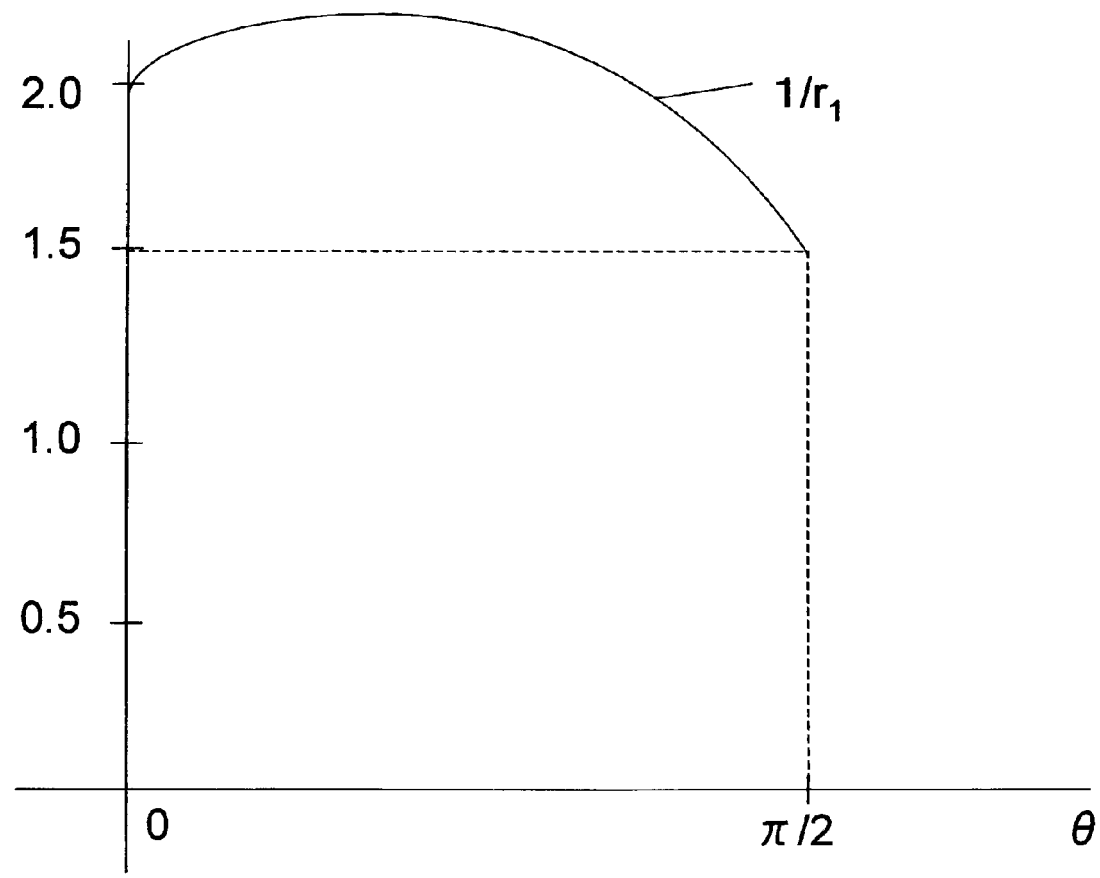
FIG. 15 is a graph to show the relationship between the reciprocal of distance $r_1$ between a point on a line of a wipe pattern and the polar coordinate center and θ in the second embodiment.
Figure 16:
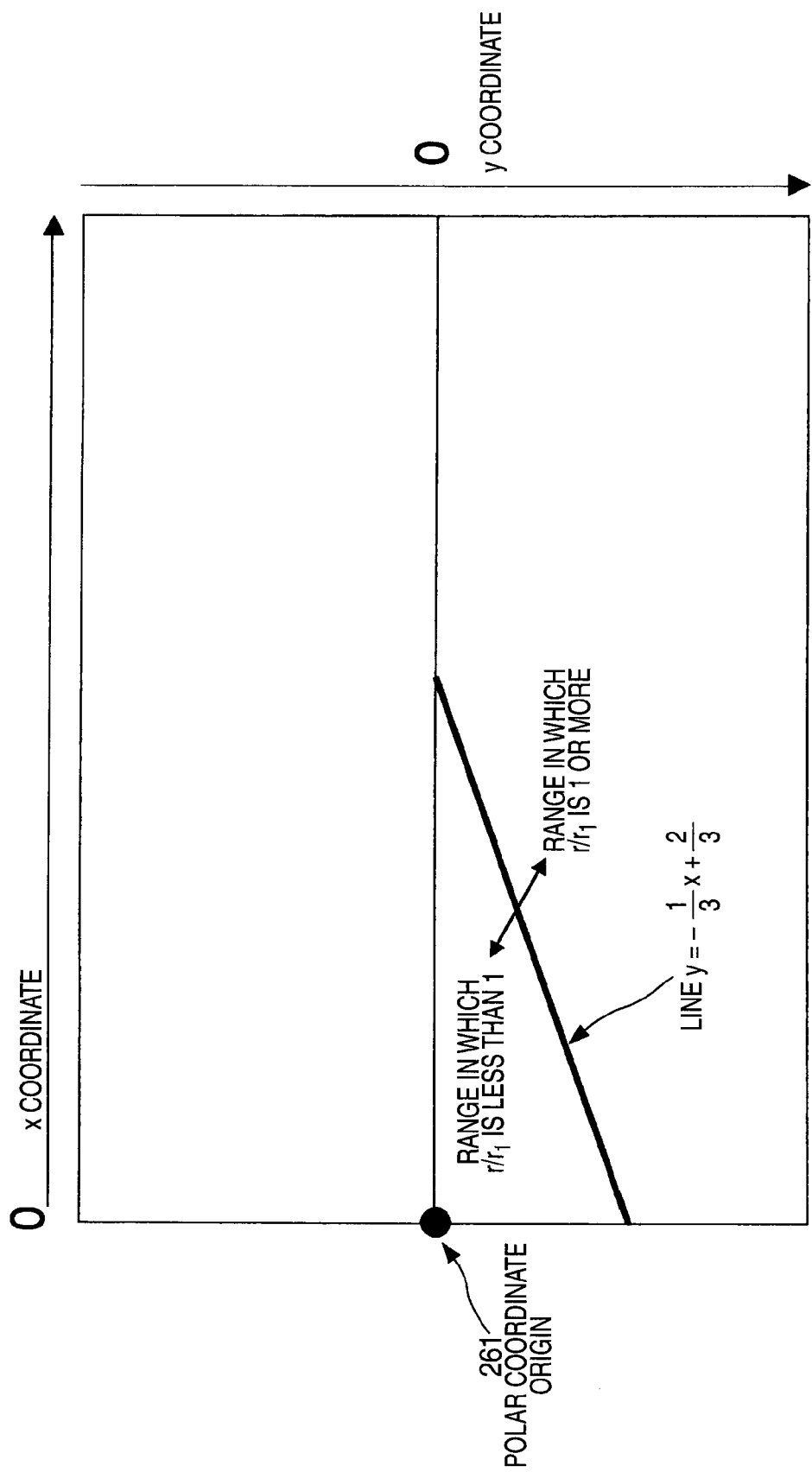
FIG. 16 is a schematic drawing to show a line forming one portion of the wipe pattern in the second embodiment.

If the reciprocal ($1/r_1$) of the distance represented by the above-mentioned (3) expression is represented on a graph, it becomes as shown in FIG. 15. FIG. 15 is a graph to show the relationship between the reciprocal of the distance $r_1$ between a point on a line of a wipe pattern and the polar coordinate center and θ in the second embodiment. FIG. 16 is a schematic drawing to show a line forming one portion of the wipe pattern in the second embodiment.

Therefore, to output the reciprocal ($1/r_1$) of the distance to generate a pattern of the line (y=−(⅓)x+⅔) using the first circuit 12, "3" may be assigned to the coefficient R1, "1" to the coefficient R2, and "½" to the coefficient R3 conforming to the description of (3) expression mentioned above.

If "1" is assigned to the coefficient R4 to which comparison of the comparator 259 is applied and various polar coordinate values obtained by scanning over a display screen in sequence are input to the circuit shown in FIG. 6 as the θ coordinate 254 and the r coordinates 255, the result as shown in FIG. 16 is obtained as the wipe pattern output 260. This means that a binary signal representing an area when the screen is partitioned into two areas with the line $(y=-(1/3)x+2/3)$ as the boundary is obtained as the wipe pattern output 260. That is, the point where the value output by the multiplier 211, namely, $(r/r_1)$ matches "1" of the coefficient R4 is positioned on the line $(y=-(1/3)x+2/3)$.

Next, the case where the input θ coordinate 254 is in the range of $(-\pi/2 \leq \theta < 0)$ in the wipe pattern shown in FIG. 9, a pattern of curve 1 is generated using the second circuit 224 in FIG. 7 will be discussed.

Figure 17:
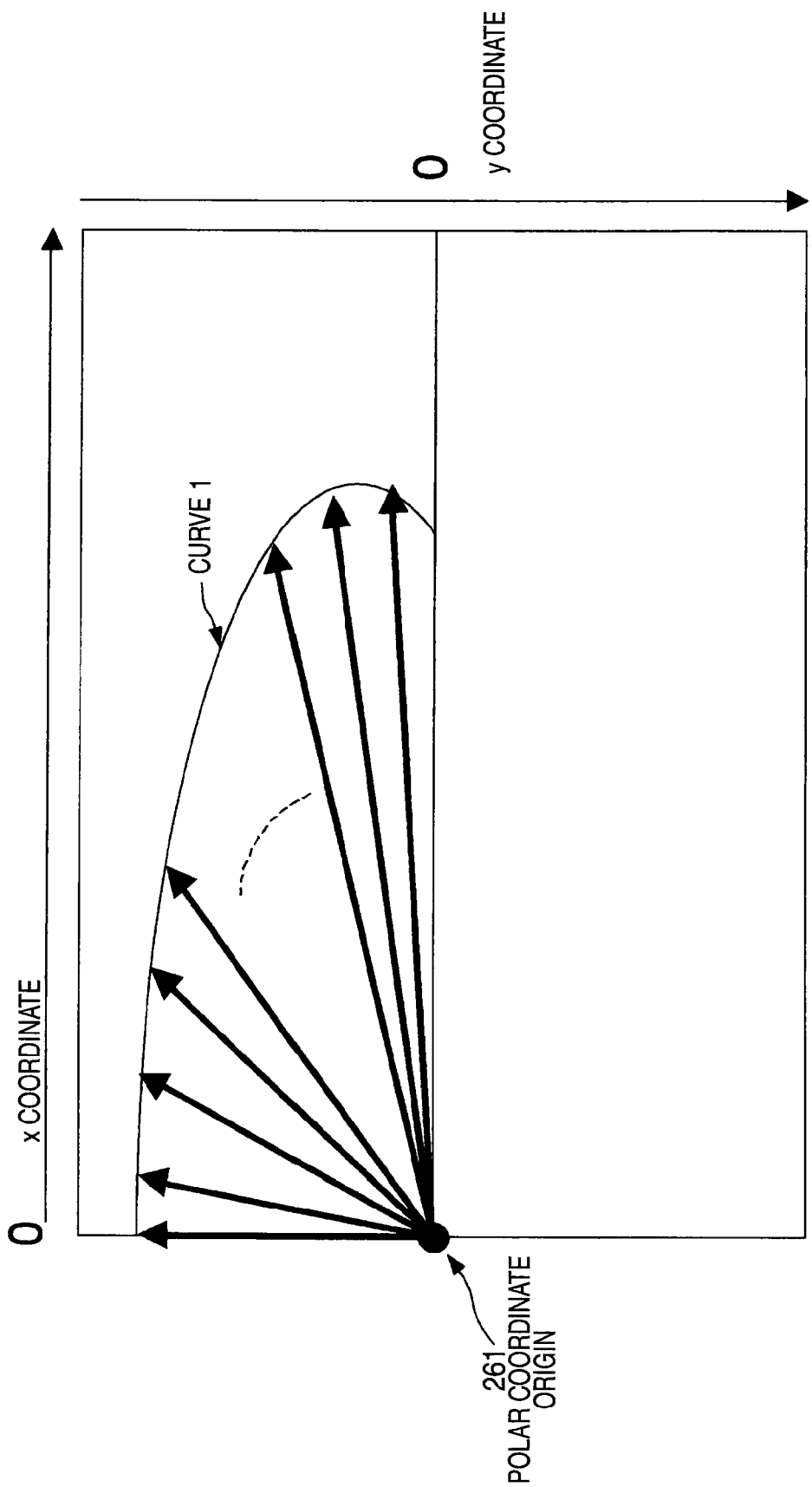
FIG. 17 is a schematic drawing to show an example of data retained in a curve 1 table shown in FIG. 7.

FIG. 17 is a schematic drawing to show an example of data retained in the curve 1 table shown in FIG. 7. The curve 1 table 221 in the second circuit 224 retains as data the reciprocal of the discrete distance from the corresponding polar coordinate origin 261 when the low-order 10 bits of the θ coordinate 254 made up of 20 bits are set to 0 to the curve 1, as shown in FIG. 17. Therefore, the high-order 10 bits of the θ coordinate 254 are given as a read address of the curve 1 table 221 and the reciprocal of the distance is read from the curve 1 table 221. However, discrete data is output from the curve 1 table 221 and thus linear interpolation is executed using the first interpolation circuit 225.

The first interpolation circuit 225 is configured as shown in FIG. 14 and the curve 1 linear interpolation coefficient table 222 retains the interpolation value corresponding to one step of the low-order 10 bits of the θ coordinate 254. The interpolation value is assigned a different value for each address corresponding to the high-order 10 bits of the θ coordinate 254. The adder 226 adds output of the curve 1 table 221 to the result of multiplying the value of the curve 1 linear interpolation coefficient table 222 by the low-order 10 bits of the θ coordinate 254 by the multiplier 223, whereby the linear interpolation result is obtained.

If the distance from the polar coordinate origin 261 to an arbitrary point on the curve 1 is represented as $r_2$, the linear interpolation result output from the first interpolation circuit 225 becomes $(1/r_2)$. If the output of the curve 1 table 221 and the linear interpolation result $(1/r_2)$ are represented on a graph, they become as shown in FIG. 18.

Figure 18:
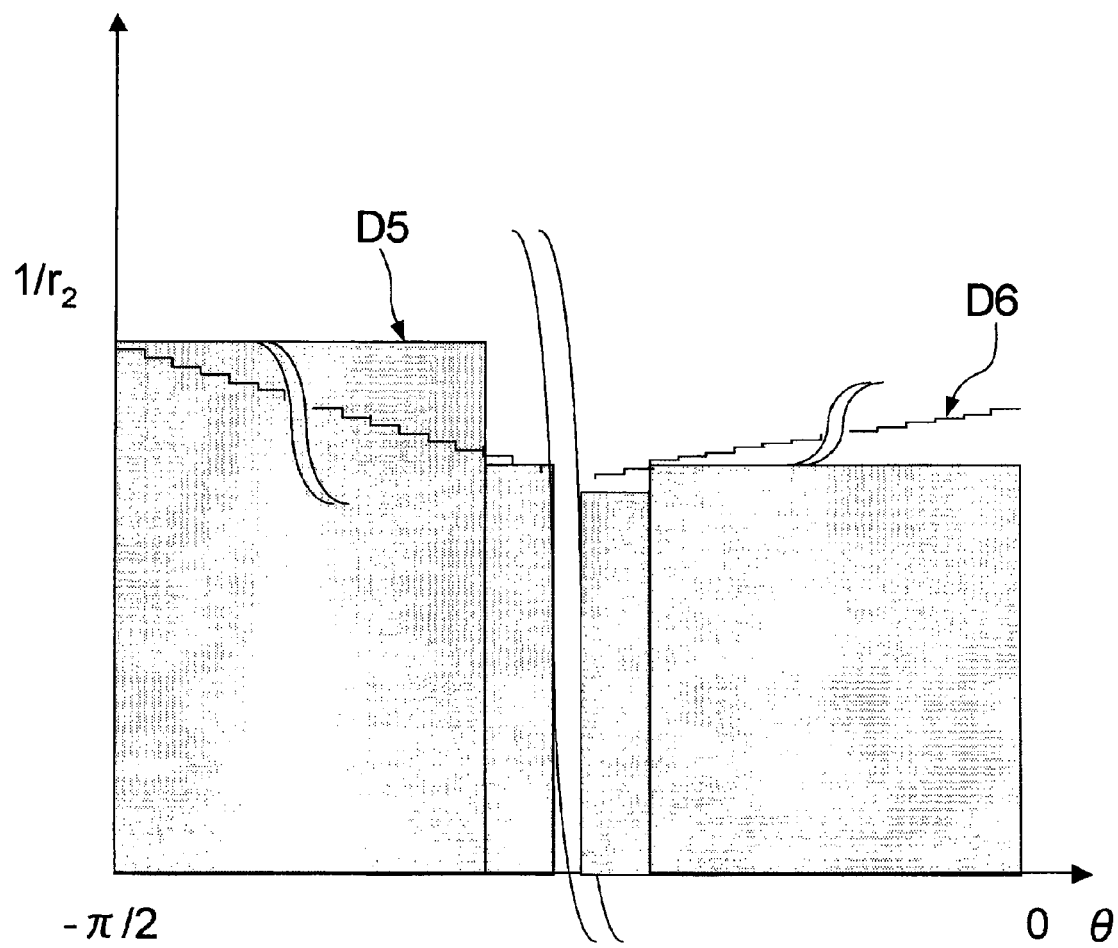
FIG. 18 is a graph to show the relationship between the reciprocal of distance $r_2$ between a point on curve 1 of the wipe pattern and the polar coordinate center and θ in the second embodiment.
Figure 19:
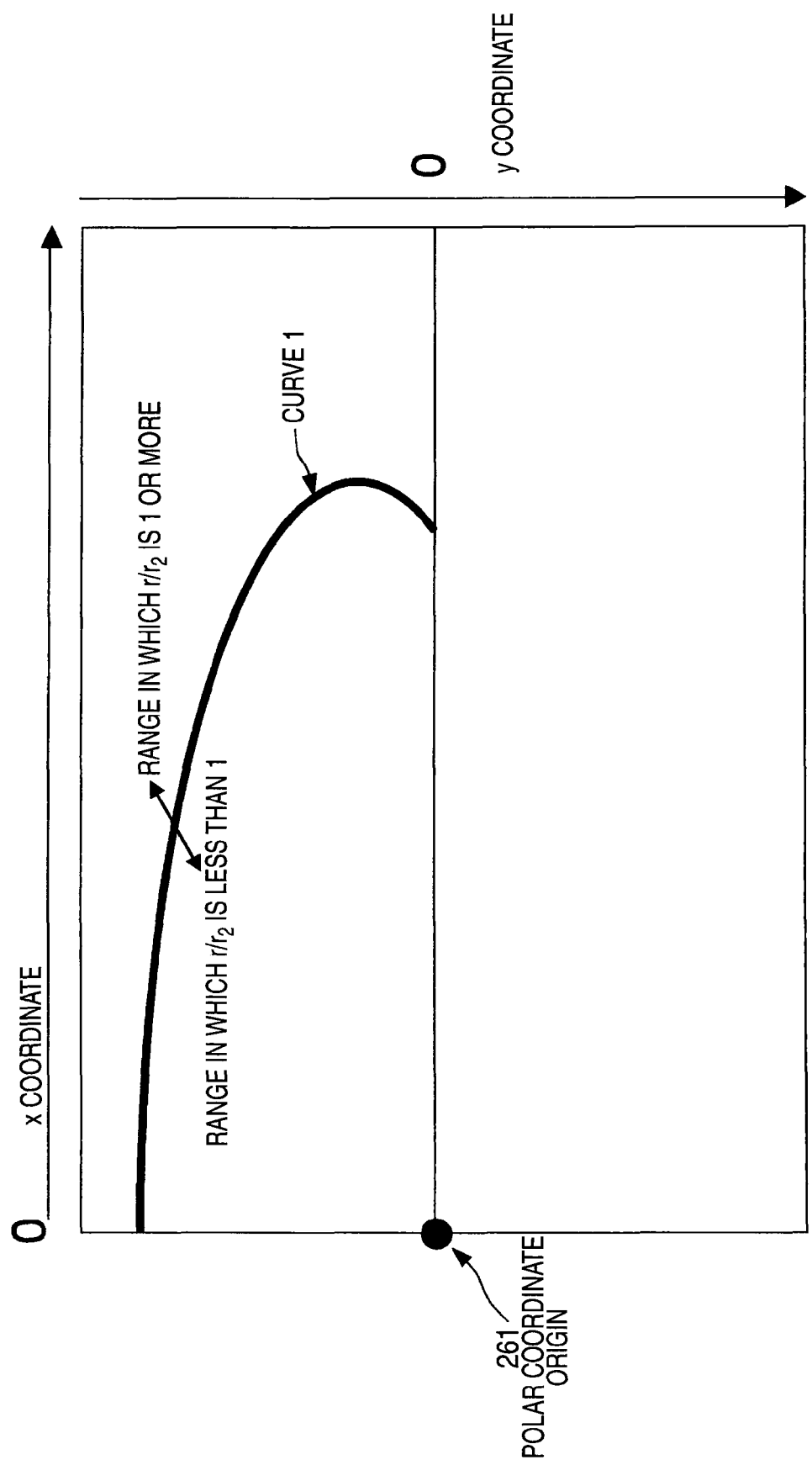
FIG. 19 is a schematic drawing to show the curve 1 forming one portion of the wipe pattern in the second embodiment.

FIG. 18 is a graph to show the relationship between the reciprocal of the distance $r_2$ between a point on the curve 1 of the wipe pattern and the polar coordinate center and θ in the second embodiment. FIG. 19 is a schematic drawing to show the curve 1 forming one portion of the wipe pattern in the second embodiment.

The second circuit 224 configured as shown in FIGS. 7 and 14 can handle the 20-bit θ coordinate 254 simply with two memory devices having an address corresponding to 10 bits and thus does not require large-capacity memory and can be implemented in a configurable size in the dynamic reconfiguration device RCF.

If "1" is assigned to the coefficient R4 to which comparison of the comparator 259 is applied and various polar coordinate values obtained by scanning over a display screen in sequence are input to the circuit shown in FIG. 7 as the θ coordinate 254 and the r coordinates 255, the result as shown in FIG. 19 is obtained as the wipe pattern output 260. This means that a binary signal representing an area when the screen is partitioned into two areas with the curve 1 as the boundary is obtained as the wipe pattern output 260. That is, the point where the value output by the multiplier 211, namely, $(r/r_2)$ matches "1" of the coefficient R4 is positioned on the curve 1.

In the actual wipe pattern generation apparatus of the embodiment, the θ range detection section 231 shown in FIGS. 6 and 7 identifies the range of the θ coordinate 254 and the circuit configuration switching section 232 dynamically switches the circuit configuration in the dynamic reconfiguration device RCF in response to the result. Therefore, as shown in FIG. 9, if the θ coordinate 254 is in the range of $(0 \leq \theta < \pi/2)$, the pattern of the line $(y=-(1/3)x+2/3)$ is generated by the action of the first circuit 212 and if the θ coordinate 254 is in the range of $(-\pi/2 \leq \theta < 0)$, the pattern of the curve 1 is generated by the action of the second circuit 224, so that a wipe pattern with a line and a curve combined consecutively can be generated.

In the embodiment, the first circuit 212 and the second circuit 224 are used to generate a wipe pattern; since the configuration is switched using the dynamic reconfiguration device RCF as a common circuit resource, the need for providing independent circuit resources for the first circuit 212 and the second circuit 224 is eliminated and miniaturization of the apparatus is made possible. Further, it becomes easy to use memory that can operate at high speed installed in a semiconductor device as the memory resources are shared for a smaller capacity, and the high-speed operation of the whole circuit is facilitated.

The case where the first circuit 212 generates the pattern of the line $(y=-(1/3)x+2/3)$ has been described as a specific example, but wipe patterns can be generated based on other various inclined lines by appropriately changing the values of the coefficients R1, R2, and R3.

For the specific configurations of the sin θ calculation section 201, the cos θ calculation section 202, the second circuit 224, etc., described above, any other circuit configuration may be adopted if the configuration can be implemented in a memory capacity that can be installed in the dynamic reconfiguration device RCF. For the curve 1, various shapes can be realized.

In the example described above, the case where the angle θ of the polar coordinates on the display screen is determined in the range of $(-\pi/2)$ to $(\pi/2)$ has been described, but the angle θ beyond the range of $(-\pi/2)$ to $(\pi/2)$ may be used in response to the difference in the place determined to be the polar coordinate origin 261. Any value other than 0 may be used for the boundary value of θ for the circuit configuration switching section 232 to switch the circuit configuration and further a plurality of values may be used as the boundary values. For the coefficient R4, any value other than 1 is adopted or the value is made variable, whereby a wipe pattern can be scaled up or down with the polar coordinate origin 261 as the center.

Third Embodiment

Figure 20:
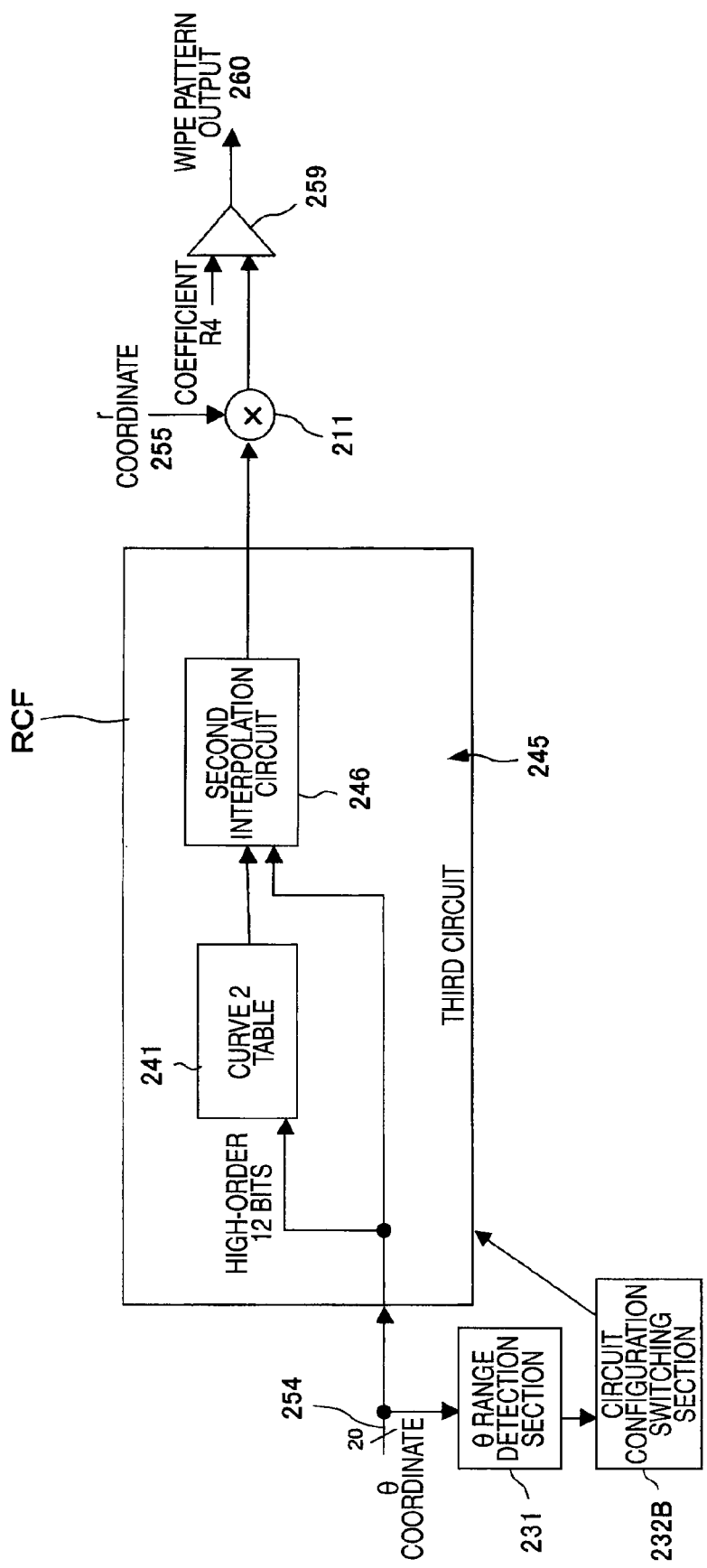
FIG. 20 is a block diagram to show a configuration example of the main part of a wipe pattern generation apparatus according to a third embodiment of the invention.
Figure 21:
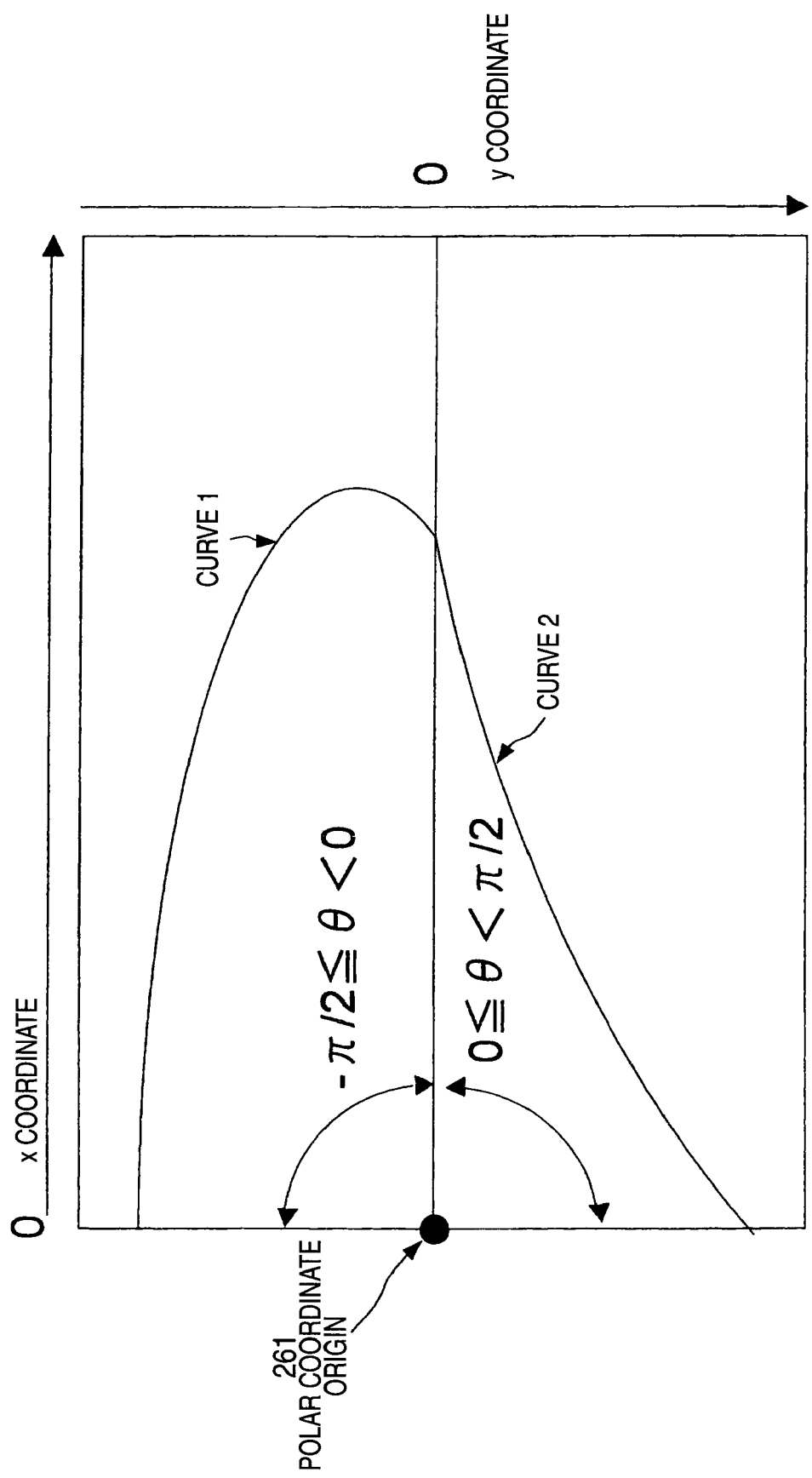
FIG. 21 is a schematic drawing to show a specific example of a wipe pattern in the wipe pattern generation apparatus of the third embodiment.

FIG. 20 is a block diagram to show a configuration example of the main part of a wipe pattern generation apparatus according to a third embodiment of the invention. FIG. 21 is a schematic drawing to show a specific example of a wipe pattern in the wipe pattern generation apparatus of the third embodiment.

The third embodiment is a modified example of the second embodiment described above. Components similar to those of the second embodiment are denoted by the same reference numerals in FIGS. 20 and 22. The description to follow centers on the configuration and the operation different from those of the second embodiment.

The third embodiment assumes the case where a wipe pattern as shown in FIG. 21 is applied to a display screen. In FIG. 21, a pixel position in a horizontal direction in the display screen is an x coordinate and a pixel position in a vertical direction is a y coordinate and the origin of the x coordinate is the upper left corner of the screen and the origin of the y coordinate is the center of the screen. A corresponding polar coordinate origin 261 is positioned at the left center of the screen. The wipe pattern shown in FIG. 21 is formed of a combination of a curve 1 and a curve 2.

The wipe pattern generation apparatus includes a θ range detection section 231, a circuit configuration switching section 232B, a dynamic reconfiguration device RCF, a multiplier 211, and a comparator 259. This means that the third embodiment differs from the second embodiment only in the configuration of the circuit configuration switching section 232B. In the third embodiment, a second circuit 224 or a third circuit 245 is formed in the dynamic reconfiguration device RCF under the control of the circuit configuration switching section 232B.

In the wipe pattern generation apparatus of the third embodiment, the function of the second circuit 224 is implemented in the dynamic reconfiguration device RCF as shown in FIG. 7 under one condition and the function of the third circuit 245 is implemented in the dynamic reconfiguration device RCF as shown in FIG. 20 under another condition as described later.

Information corresponding to the pixel coordinates (x coordinate, y coordinate) of the scan position in the display screen is input to the wipe pattern generation apparatus as polar coordinates as in the second embodiment. The polar coordinates are made up of a combination of an r coordinate 255 representing the distance from the polar coordinate origin 261 and a θ coordinate 254 representing the angle relative to the reference axis. In the example shown in FIG. 20, the θ coordinate 254 is input as 20-bit parallel binary data.

The θ range detection section 231 determines the range of the angle to which the input θ coordinate 254 belongs. Specifically, the θ range detection section 231 determines whether or not a condition of $(0 \leq \theta < \pi/2)$ is satisfied and whether or not a condition of $(-\pi/2 \leq \theta < 0)$ is satisfied.

The circuit configuration switching section 232B controls the dynamic reconfiguration device RCF in accordance with the determination result of the θ range detection section 231 and dynamically switches the circuit configured in the dynamic reconfiguration device RCF. That is, if the input θ coordinate 254 satisfies the condition of $(0 \leq \theta < \pi/2)$, the circuit configuration switching section 232B configures the third circuit 245 of the configuration as shown in FIG. 20 in the dynamic reconfiguration device RCF; if the input θ coordinate 254 satisfies the condition of $(-\pi/2 \leq \theta < 0)$, the circuit configuration switching section 232B configures the second circuit 224 of the configuration as shown in FIG. 7 in the dynamic reconfiguration device RCF.

The configuration and the operation of the second circuit 224 shown in FIG. 7 are as described above in the second embodiment.

As shown in FIG. 20, the third circuit 245 configured in the dynamic reconfiguration device RCF includes a curve 2 table 241 and a second interpolation circuit 246. The high-order 12 bits of the θ coordinate 254 are input to the curve 2 table 241 and output of the curve 2 table 241 and the θ coordinate 254 are input to the second interpolation circuit 246.

Figure 22:
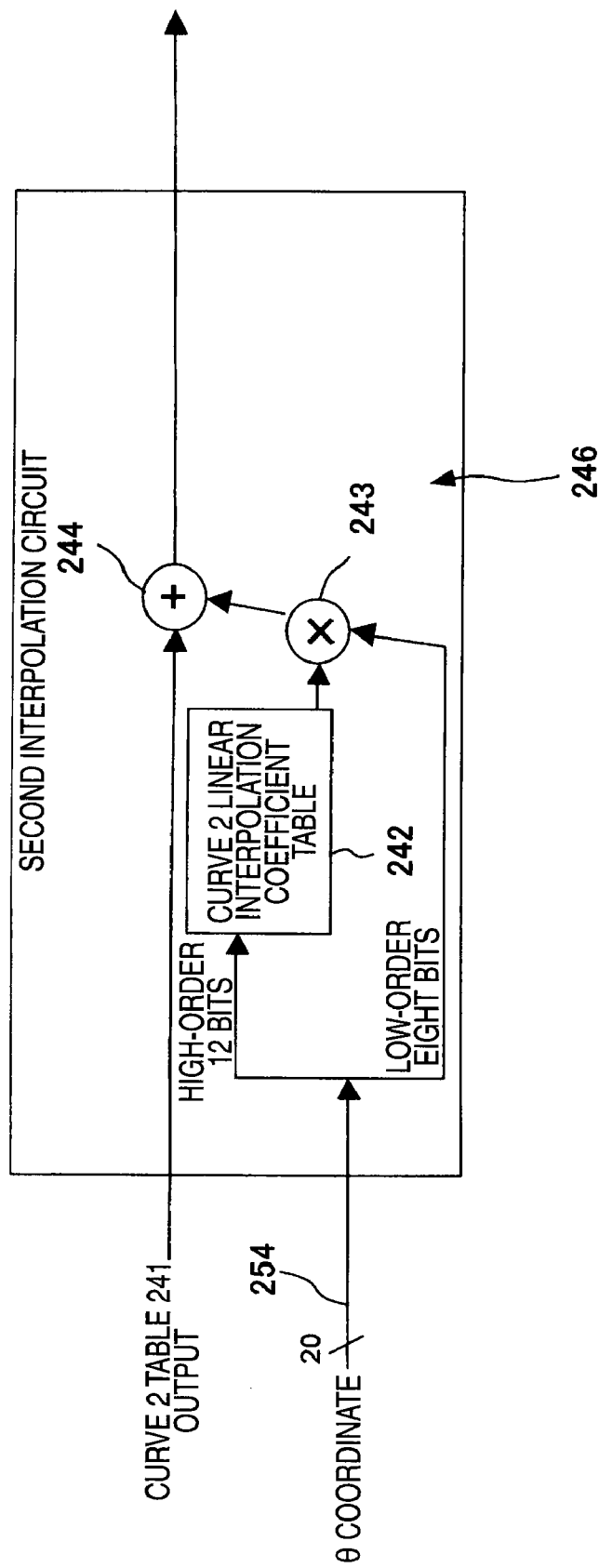
FIG. 22 is a block diagram to show the specific configuration of a second interpolation circuit shown in FIG. 20.

FIG. 22 is a block diagram to show the specific configuration of the second interpolation circuit shown in FIG. 20. The second interpolation circuit 246 is made up of a curve 2 linear interpolation coefficient table 242, a multiplier 243, and an adder 244. The high-order 12 bits of the θ coordinate 254 are input to the curve 2 linear interpolation coefficient table 242 as a read address and the corresponding interpolation coefficient is output therefrom. The multiplier 243 multiplies the output of the curve 2 linear interpolation coefficient table 242 by the value of the low-order eight bits of the θ coordinate 254 and outputs the result. The adder 244 adds the output of the curve 2 table 241 and the output of the multiplier 243 and outputs the result.

Next, the configuration and the operation to generate a specific wipe pattern in the second embodiment will be discussed.

If the input θ coordinate 254 is in the range of $(-\pi/2 \leq \theta < 0)$, the circuit configuration switching section 232B forms the second circuit 224 in the dynamic reconfiguration device RCF and thus the pattern of the curve 1 shown in FIG. 21 is generated by the action of the second circuit 224 as in the second embodiment. On the other hand, if the input θ coordinate 254 is in the range of $(0 \leq \theta < \pi/2)$, the circuit configuration switching section 232B forms the third circuit 245 in the dynamic reconfiguration device RCF.

Figure 23:
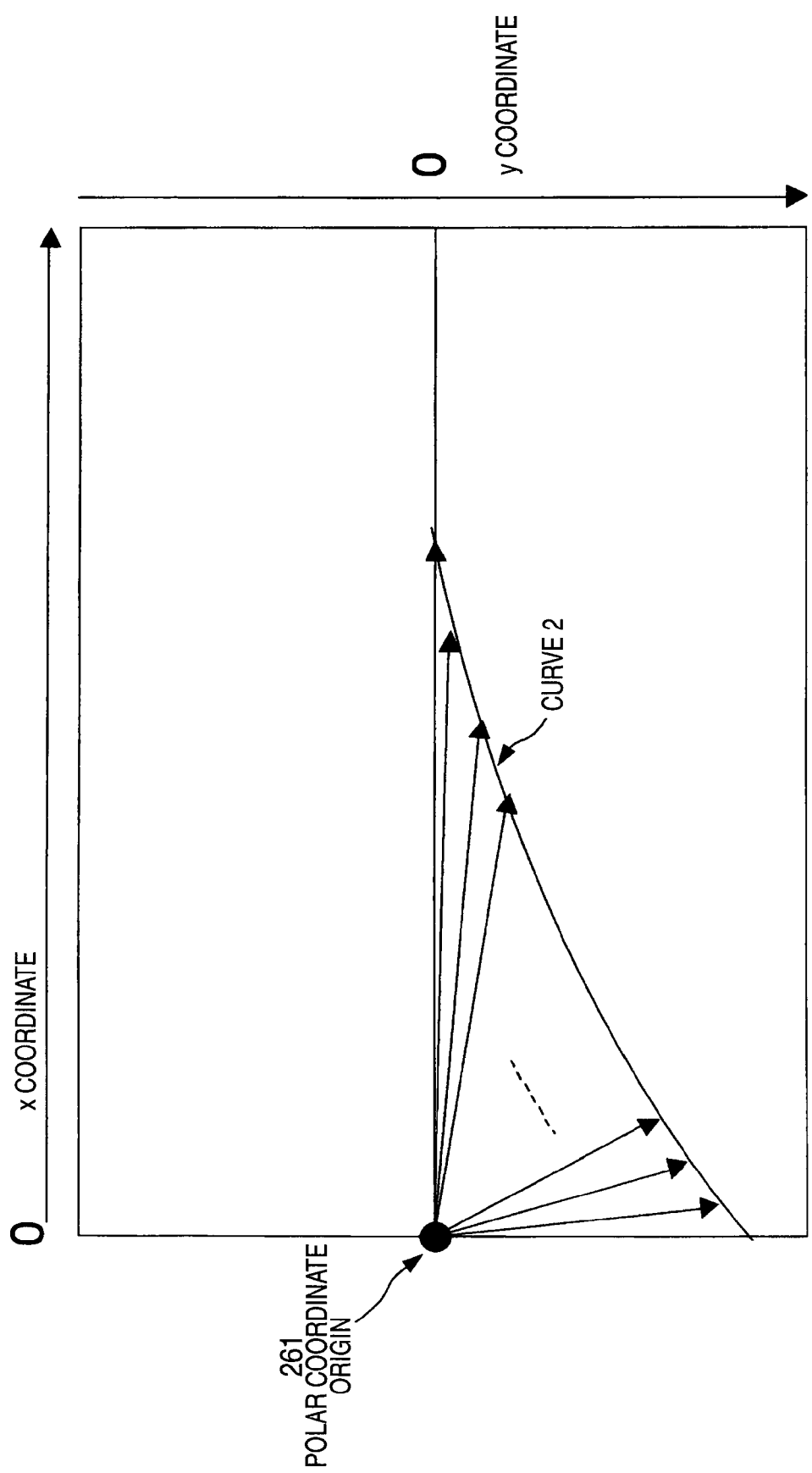
FIG. 23 is a schematic drawing to show an example of data retained in a curve 2 table shown in FIG. 20.

FIG. 23 is a schematic drawing to show an example of data retained in the curve 2 table shown in FIG. 20. In the curve 2 table 241 in the third circuit 245, the reciprocal of distance $r_3$ from the polar coordinate origin 161 to an arbitrary point on the curve 2 is retained as discrete data assuming the case where the low-order eight bits of the θ coordinate 254 made up of 20 bits are 0. Therefore, the high-order 12 bits of the θ coordinate 254 are given to the curve 2 table 241 as a read address, whereby data of the reciprocal of the distance $r_3$ is read from the curve 2 table 241.

The second interpolation circuit 246 in the third circuit 245 is provided for linearly interpolating data output from the curve 2 table 241. The curve 2 linear interpolation coefficient table 242 provided in the second interpolation circuit 246 retains an interpolation coefficient corresponding to one step of the low-order eight bits of the θ coordinate 254. Since an appropriate interpolation coefficient varies in response to the value of the high-order 12 bits of the θ coordinate 254, different interpolation coefficients are stored in the addresses associated with the values of the high-order 12 bits of the θ coordinate 254. Therefore, the high-order 12 bits of the θ coordinate 254 are given as the read address of the curve 2 linear interpolation coefficient table 242, whereby the appropriate interpolation coefficient is read from the curve 2 linear interpolation coefficient table 242.

Figure 24:
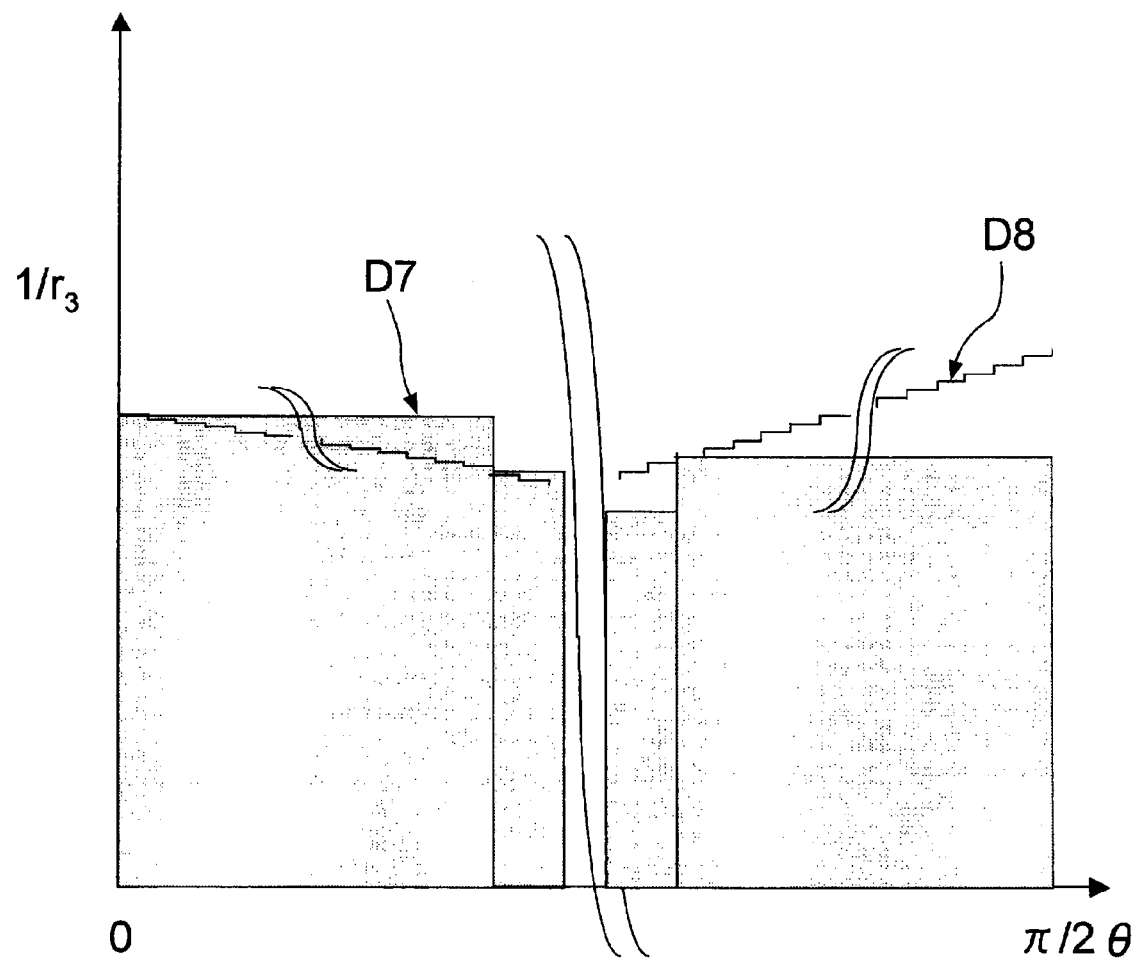
FIG. 24 is a graph to show the relationship between the reciprocal of distance $r_3$ between a point on curve 2 of the wipe pattern and the polar coordinate center and θ in the third embodiment.
Figure 25:
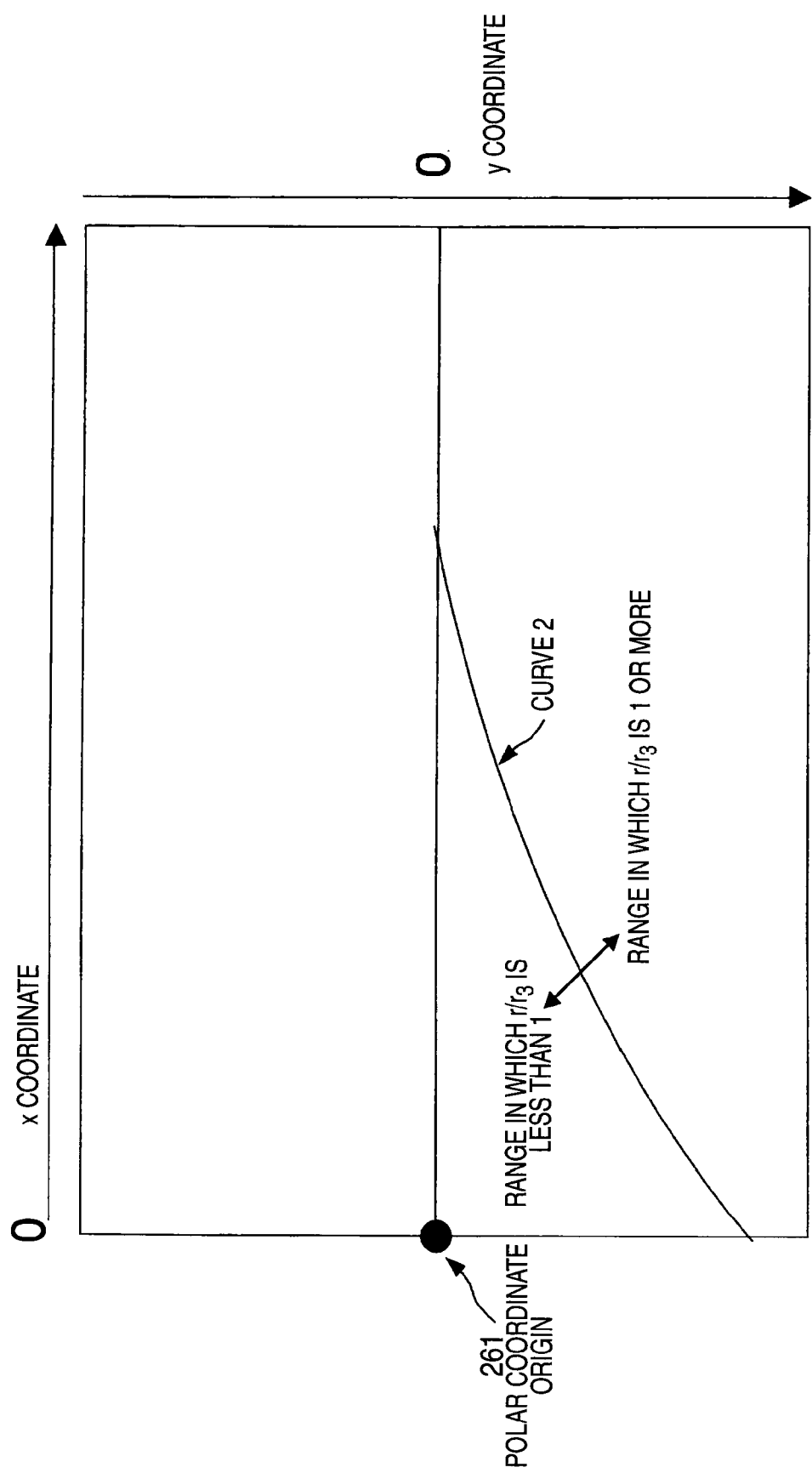
FIG. 25 is a schematic drawing to show the curve 2 forming one portion of the wipe pattern in the third embodiment.
Figure 26:
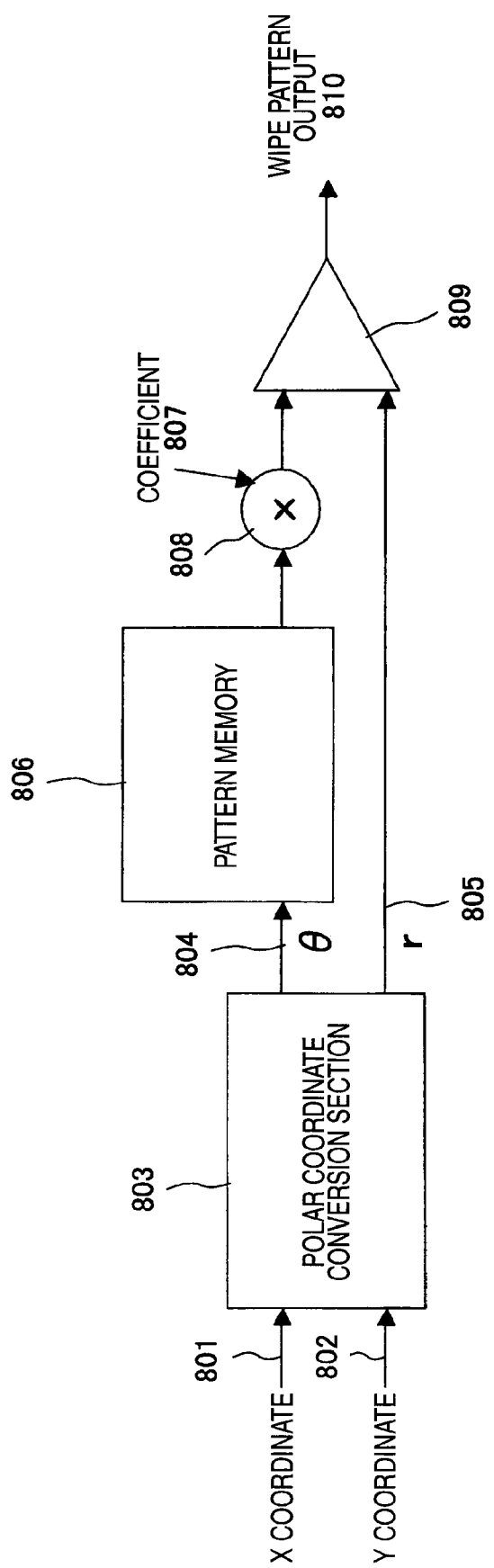
FIG. 26 is a block diagram to show the configuration of a wipe pattern generation apparatus in a related art example.
Figure 27:
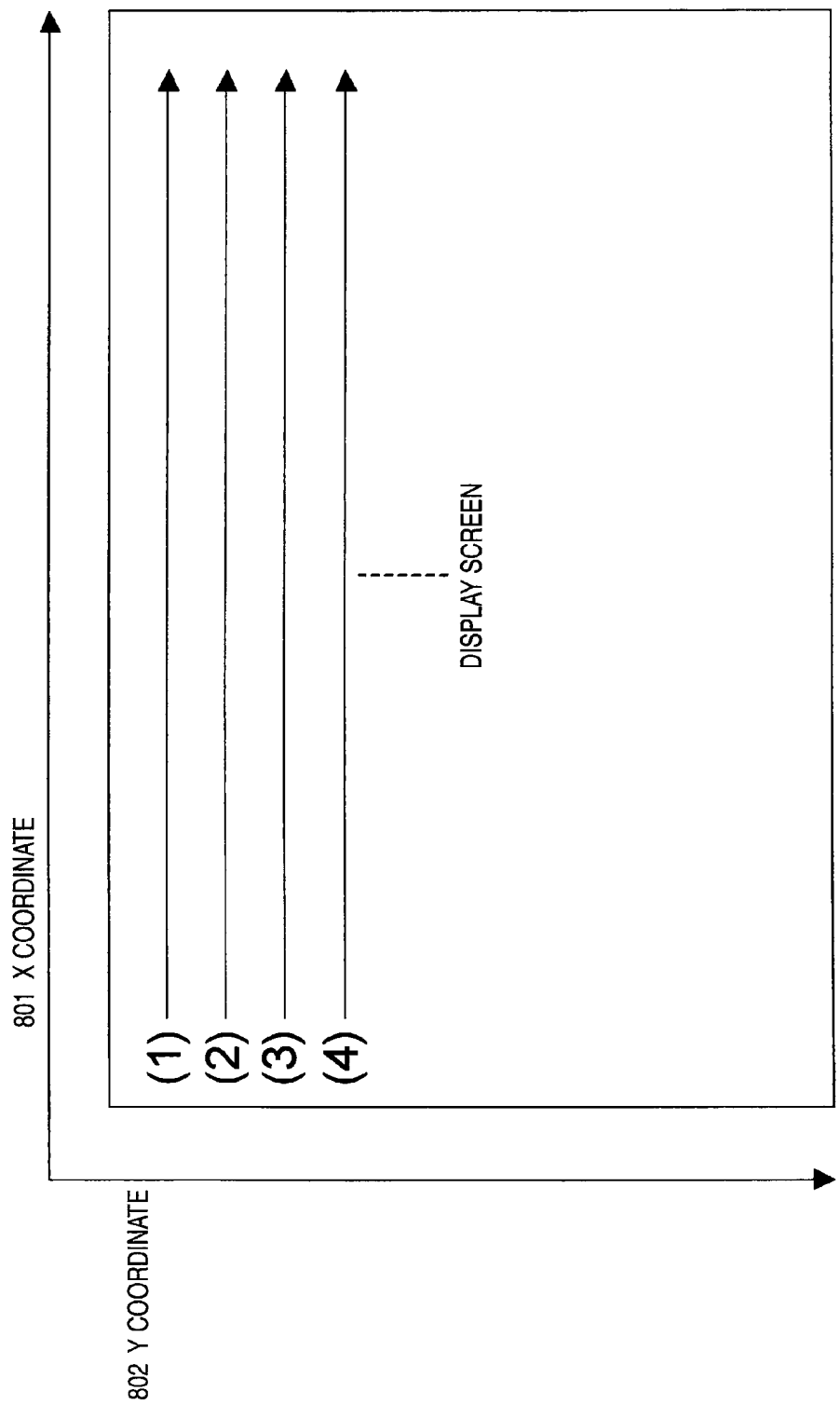
FIG. 27 is a front view to show an example of a display screen to which a wipe pattern is applied.
Figure 28:
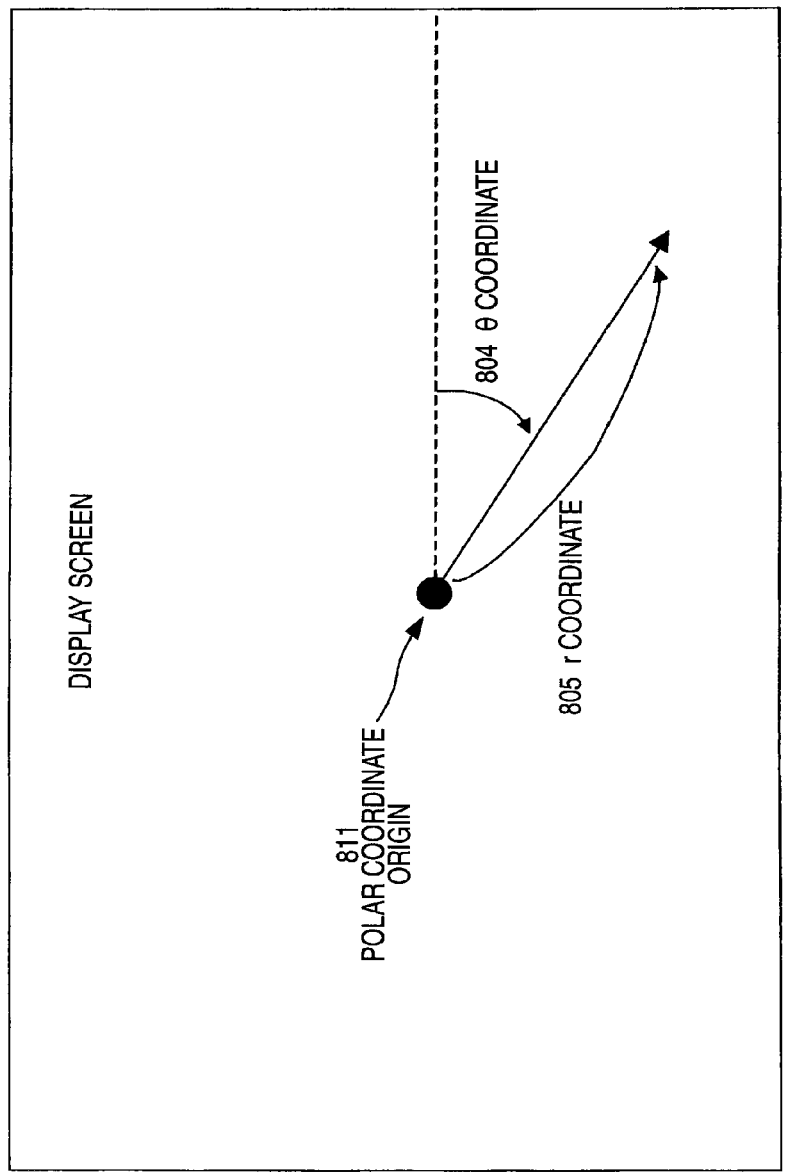
FIG. 28 is a schematic drawing to show an example of polar coordinates on a display screen.
Figure 29:
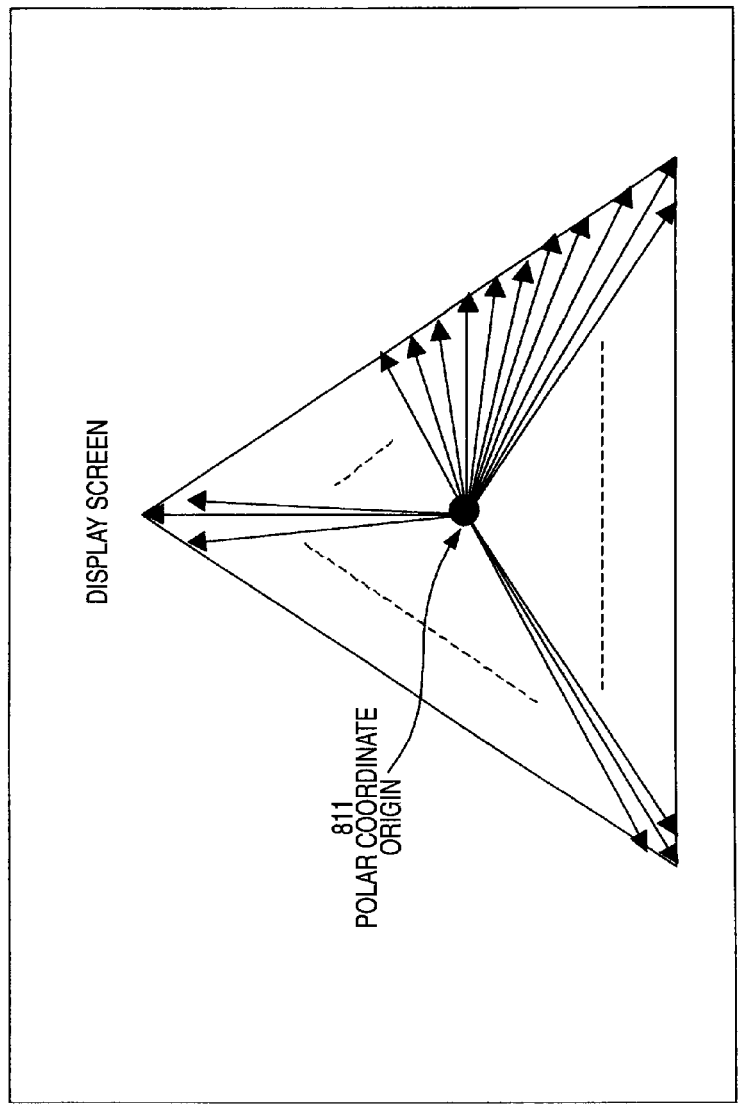
FIG. 29 is a schematic drawing to show an example of data retained in memory in the wipe pattern generation apparatus in the related art example.
Figure 30:
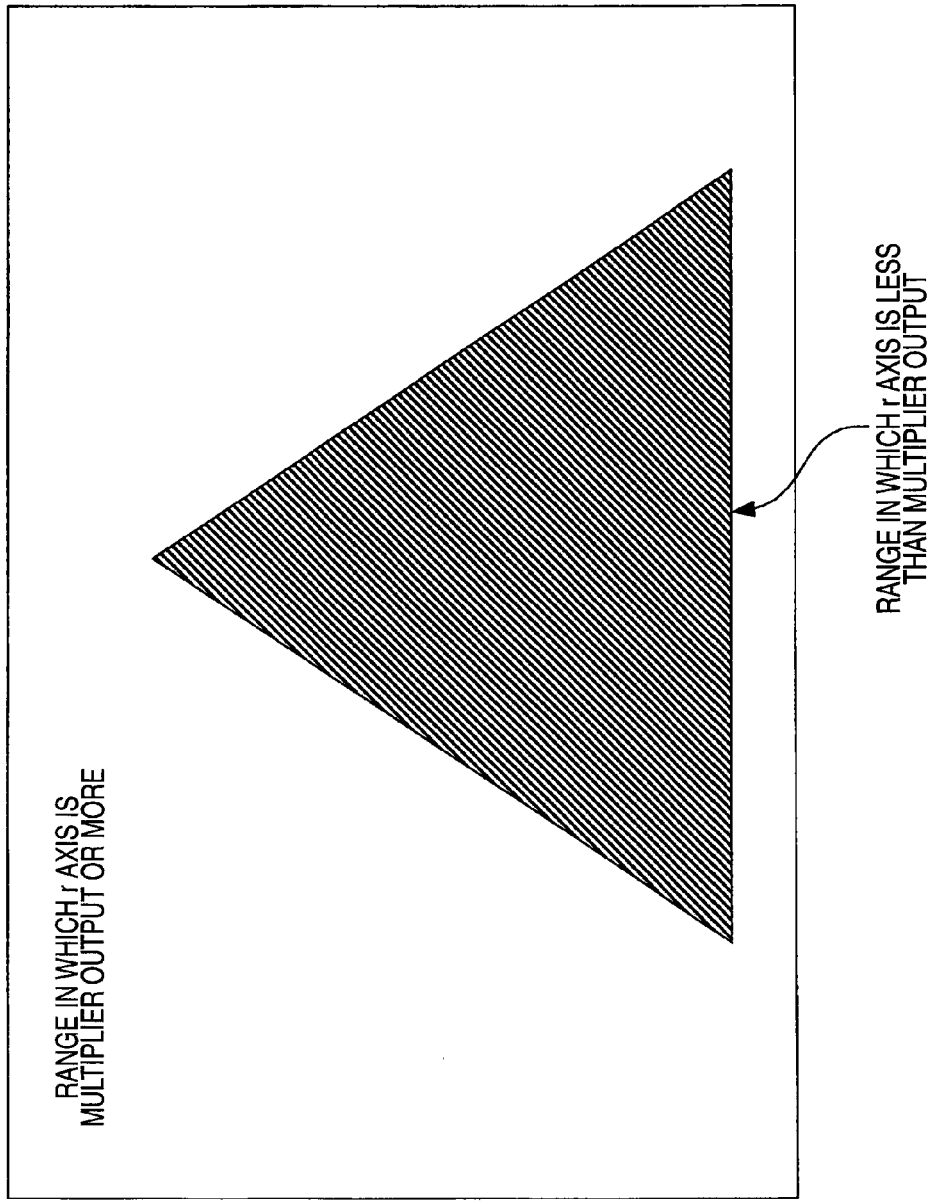
FIG. 30 is a front view to show a state in which a display screen is partitioned according to a generated wipe pattern.

FIG. 24 is a graph to show the relationship between the reciprocal of the distance $r_3$ between a point on the curve 2 of the wipe pattern and the polar coordinate center and θ in the third embodiment. FIG. 25 is a schematic drawing to show the curve 2 forming one portion of the wipe pattern in the third embodiment.

The multiplier 243 multiplies the value of the low-order eight bits of the θ coordinate 254 by the interpolation coefficient output from the curve 2 linear interpolation coefficient table 242 and outputs the result. The adder 244 adds the value output from the curve 2 table 241 and the value output by the multiplier 243 and outputs the result as the liner interpolation result. This liner interpolation result is the reciprocal of the distance $r_3$ ($1/r_3$) described above (see FIG. 24).

The third circuit 245 configured as shown in FIGS. 20 and 22 can handle the 20-bit θ coordinate 254 simply with memory having an address corresponding to 12 bits and memory having an address corresponding to eight bits and thus does not require large-capacity memory and can be implemented in a configurable size in the dynamic reconfiguration device RCF.

The multiplier 211 multiplies ($1/r_2$) output from the second circuit 224 or ($1/r_3$) output from the third circuit 245 by the r coordinate 255 and outputs the result. The comparator 259 makes a comparison between the value output by the multiplier 211 (($r/r_2$) or ($r/r_3$)) and the coefficient R4 and outputs the result as wipe pattern output 260.

If "1" is assigned to the coefficient R4 to which comparison of the comparator 259 is applied and various polar coordinate values obtained by scanning over a display screen in sequence are input to the circuit shown in FIG. 20 as the θ coordinate 254 and the r coordinates 255, the result as shown in FIG. 25 is obtained as the wipe pattern output 260. This means that a binary signal representing an area when the screen is partitioned into two areas with the curve 2 as the boundary is obtained as the wipe pattern output 260. That is, the point where the value output by the multiplier 211, namely, ($r/r_3$) matches "1" of the coefficient R4 is positioned on the curve 2.

In the third embodiment, the second circuit 224 and the third circuit 245 are used to generate a wipe pattern; since the configuration is switched using the dynamic reconfiguration device RCF as a common circuit resource, the need for providing independent circuit resources for the second circuit 224 and the third circuit 245 is eliminated and miniaturization of the apparatus is made possible. Further, it becomes easy to use memory that can operate at high speed installed in a semiconductor device as the memory resources are shared for a smaller capacity, and the high-speed operation of the whole circuit is facilitated.

For the configuration of the third circuit 245, any other circuit configuration than the configuration shown in FIG. 22 may be adopted if the configuration can be implemented in a memory capacity that can be installed in the dynamic reconfiguration device RCF. For the curve 2 various shapes can be realized.

In the example described above, the case where the angle θ of the polar coordinates on the display screen is determined in the range of ($-\pi/2$) to ($\pi/2$) has been described, but the angle θ beyond the range of ($-\pi/2$) to ($\pi/2$) may be used in response to the difference in the place determined to be the polar coordinate origin 261. Any value other than θ may be used for the boundary value of θ for the circuit configuration switching section 232B to switch the circuit configuration and further a plurality of values may be used as the boundary values. For the coefficient R4, any value other than 1 is adopted or the value is made variable, whereby a wipe pattern can be scaled up or down with the polar coordinate origin 261 as the center.

According to the wipe pattern generation apparatus of the second and third embodiments described above, it is made possible to generate various patterns without using large-capacity ROM. Since large-capacity ROM is not used, the pattern generation speed can be prevented from becoming low and a high-resolution display screen can also be handled. Moreover, the dynamic reconfiguration device is used and the configuration thereof is changed in response to the angle range of the polar coordinates, thereby switching the pattern to be generated, so that the limited hardware resources can be effectively utilized and various types of patterns can be generated. Therefore, the wipe pattern generation apparatus of the embodiment can generate various wipe patterns at high speed owing to the miniaturized and speeded-up configuration and can be used widely in each field where video and image are produced, edited, etc.

While the embodiments of the invention have been described, it is to be understood that the invention is not limited to the items disclosed in the embodiments and that those skilled in the art can also add various changes and modifications to and apply one portion of the configuration and the operation without departing from the sprit and the scope of the invention based on the Description and widely known arts, needless to say.

This application is based on Japanese Patent Application (No. 2005-322280) filed on Nov. 7, 2005, and Japanese Patent Application (No. 2005-322281) filed on Nov. 7, 2005, which are incorporated herein by reference.

INDUSTRIAL APPLICABILITY

The invention is useful for a wipe pattern generation apparatus, etc., which has the advantages that it can generate wipe patterns of various shapes at high speed and moreover can be easily miniaturized, and is used for video production, etc., particularly can generate a large number of types of wipe patterns.

The invention claimed is:

1. A wipe pattern generation apparatus for inputting position information corresponding to each pixel on a display screen as polar coordinate data represented by a combination of angle data θ and distance data r from the polar coordinate center and outputting the comparison result between the polar coordinate data and predetermined pattern information, said wipe pattern generation apparatus comprising:
a sin θ calculation section for calculating sin θ from the input angle data θ;
a first multiplication section for multiplying the calculation result of sin θ by a first coefficient;
a cos θ calculation section for calculating cos θ from the angle data θ;
a second multiplication section for multiplying the calculation result of cos θ by a second coefficient;
a third multiplication section for multiplying the result of adding output of said first multiplication section and output of said second multiplication section by a third coefficient, and outputting the third coefficient multiplied by the result of adding output of said first multiplication section and output of said second multiplication section as a reciprocal of the distance from the polar coordinate center to an arbitrary line on the display screen;
a fourth multiplication section for multiplying output of said third multiplication section by the distance data r; and
a comparison section for making a comparison between output of said fourth multiplication section and a fourth coefficient.

2. A wipe pattern generation apparatus for inputting position information corresponding to each pixel on a display screen as polar coordinate data represented by a combination of angle data θ and distance data r from the polar coordinate center and outputting the comparison result between the polar coordinate data and predetermined pattern information, said wipe pattern generation apparatus comprising:
a dynamic reconfiguration device including a digital signal processing function;
a first circuit configuring section for configuring in said dynamic reconfiguration device a first circuit having a sin θ calculation section for calculating sin θ from the input angle data θ, a first multiplication section for multiplying the calculation result of sin θ by a first coefficient, a cos θ calculation section for calculating cos θ from the angle data θ, a second multiplication section for multiplying the calculation result of cos θ by a second coefficient, and a third multiplication section for multiplying the result of adding output of said first multiplication section and output of said second multiplication section by a third coefficient for calculating a reciprocal of the distance from the polar coordinate center to an arbitrary line on the display screen;
a second circuit configuring section for configuring in said dynamic reconfiguration device a second circuit having memory for retaining a reciprocal of discrete distance data from the polar coordinate center corresponding to the high-order bits of the angle data θ to an arbitrary curve and an interpolation section for interpolating output of the memory using the angle data θ;
a configuration switching section for determining an angle range to which the angle data θ belongs, controlling said first circuit configuring section and said second circuit configuring section in response to the range of the angle data θ, and dynamically switching between the first circuit and the second circuit; and a comparison section for making a comparison between the result of multiplying output of the first circuit or output of the second circuit by the distance data r of the polar coordinates and a fourth coefficient.

3. A wipe pattern generation apparatus for inputting position information corresponding to each pixel on a display screen as polar coordinate data represented by a combination of angle data θ and distance data r from the polar coordinate center and outputting the comparison result between the polar coordinate data and predetermined pattern information, said wipe pattern generation apparatus comprising:

a dynamic reconfiguration device including a digital signal processing function;

a second circuit configuring section for configuring in said dynamic reconfiguration device a second circuit having memory for retaining a reciprocal of discrete distance data from the polar coordinate center corresponding to the high-order bits of the angle data θ to a first curve and an interpolation section for interpolating output of the memory using the angle data θ;

a third circuit configuring section for configuring in said dynamic reconfiguration device a third circuit having memory for retaining a reciprocal of discrete distance data from the polar coordinate center corresponding to the high-order bits of the angle data θ to a second curve and an interpolation section for interpolating output of the memory using the angle data θ;

a configuration switching section for determining an angle range to which the angle data θ belongs, controlling said second circuit configuring section and said third circuit configuring section in response to the range of the angle data θ, and dynamically switching between the second circuit and the third circuit; and a comparison section for making a comparison between the result of multiplying output of the second circuit or output of the third circuit by the distance data r of the polar coordinates and a fourth coefficient.

\* \* \* \* \*